(12) United States Patent
Pabon

(10) Patent No.: US 8,368,252 B2
(45) Date of Patent: Feb. 5, 2013

(54) HIGH- AND LOW-POWER POWER SUPPLY WITH STANDBY POWER SAVING FEATURES

(75) Inventor: Gus Charles Pabon, Cupertino, CA (US)

(73) Assignee: Green Plug, Inc., San Ramon, CA (US)

(*) Notice: Subject to any disclaimer, the term of this patent is extended or adjusted under 35 U.S.C. 154(b) by 32 days.

(21) Appl. No.: 12/885,156

(22) Filed: Sep. 17, 2010

(65) Prior Publication Data

US 2011/0057724 A1 Mar. 10, 2011

Related U.S. Application Data

(63) Continuation of application No. PCT/US2010/047185, filed on Aug. 30, 2010.

(60) Provisional application No. 61/238,112, filed on Aug. 28, 2009.

(51) Int. Cl.
*H02J 3/00* (2006.01)

(52) U.S. Cl. .................................. 307/82; 307/31

(58) Field of Classification Search .............. 307/31, 307/92
See application file for complete search history.

(56) References Cited

U.S. PATENT DOCUMENTS

| 5,477,091 A * | 12/1995 | Fiorina et al. ............... 307/66 |
| 6,920,056 B2 * | 7/2005 | MacDonald et al. ......... 363/142 |
| 7,157,888 B2 * | 1/2007 | Chen et al. .................. 323/224 |
| 7,274,116 B2 * | 9/2007 | Inoue et al. .................. 307/100 |
| 2005/0029872 A1 | 2/2005 | Ehrman et al. |
| 2006/0132111 A1 | 6/2006 | Jacobs et al. |
| 2008/0307240 A1 | 12/2008 | Dahan et al. |

OTHER PUBLICATIONS

PCT/US10/47185, PCT International Search Report dated Oct. 14, 2010.
PCT/US10/47185, PCT Written Opinion of the International Searching Authority dated Oct. 14, 2010.

* cited by examiner

*Primary Examiner* — Hal Kaplan

(57) ABSTRACT

A power supply for providing power to an electrical device is described. The power supply converts a received input signal to a first electrical having a first voltage level at a first power converter. The power supply additionally converts the first electrical signal to a second electrical signal having a second voltage level at a second power converter, to provide the second electrical signal having the second voltage level to an output port. The power supply includes a circuit to selectively bypass the second power converter and provide the first electrical signal having the first voltage level from the first power converter to the output port. The first power converter may include one or more switches that may be disabled to disconnect power from the first power converter for additional standby power saving features.

15 Claims, 13 Drawing Sheets

HIGH- AND LOW-POWER POWER SUPPLY WITH STANDBY POWER SAVING FEATURES

CROSS-REFERENCE TO RELATED APPLICATIONS

This application is a continuation of PCT Application PCT/US10/47185, filed Aug. 30, 2010, which claims priority from U.S. Provisional Application 61/238,112, filed Aug. 28, 2009.

TECHNICAL FIELD

The disclosed embodiments relate generally to power controls, power supplies, and, more particularly, to a power supply to deliver high or low power to devices powered by the power supply.

BACKGROUND

From laptop computers and personal digital assistants to multimedia players and mobile phones, a wide variety of electronic devices require power from a power source, and rely on communication between two electronic systems to optimize their operation and collaboration. These electronic devices come with a wide variety of power supplies, sometimes referred to as "wall warts," "power bricks," or "power adapters." Unfortunately, these power supplies are often specific to the device type, device manufacturer, and/or device product line, and are therefore incompatible with each other. If a user loses a power supply for a device, the power supply of another device generally cannot be used as a substitute. This causes many problems. Travel is made more inconvenient by the prospect of having to carry multiple power supplies for various portable devices. A device may be damaged and/or its useful life shortened if the wrong power supply is used. Furthermore, as devices become obsolete and are discarded, the power supplies for the devices may have to be discarded as well because users often do not have other devices that are compatible with these power supplies.

Attempts have been made to resolve the problem associated with incompatible power supplies. In one example, a common power supply hub is used to supply power to different devices or to multiple devices. The power supply hub may have a single port for powering one device at a time, or multiple ports to supply power to multiple devices. In some instances, multiple port power supply hubs may accommodate different types of connectors. In other instances, the supply hubs may accommodate identical connectors.

However, because different devices may have varying power needs, conventional power supplies are unable to accommodate both high and low powered devices effectively. For typical power supply hub architectures, having either a single port or multi-ports, each port is burdened by the cost and size of a power circuit that has the ability to deliver power to the highest powered load device that may be connected. In effect, each port has to be over-designed to meet the highest-power application. For cost-sensitive products, such as power supply hubs, this is not an acceptable approach.

Furthermore, conventional power supplies typically waste power due to inefficient design. For example, due to design limitations, a power supply continues to drain power while it is connected to an AC power source, such as to a wall outlet, even when a load device is not connected to the power supply or when the load device is on a power saving mode. The power supply has to be physically disconnected from the AC power source to save power. Today's load devices typically come with innovative power-saving features. It is undesirable to have a power efficient load device connecting to a power supply that operates inefficiently and wastes power. Thus, power-saving features in the power supply are desired to connect to power efficient load devices.

BRIEF DESCRIPTION OF THE DRAWINGS

For a better understanding of the embodiments of the invention(s), reference should be made to the Detailed Description below, in conjunction with the following drawings in which like reference numerals refer to corresponding parts throughout the figures.

DETAILED DESCRIPTION

Figure 1:
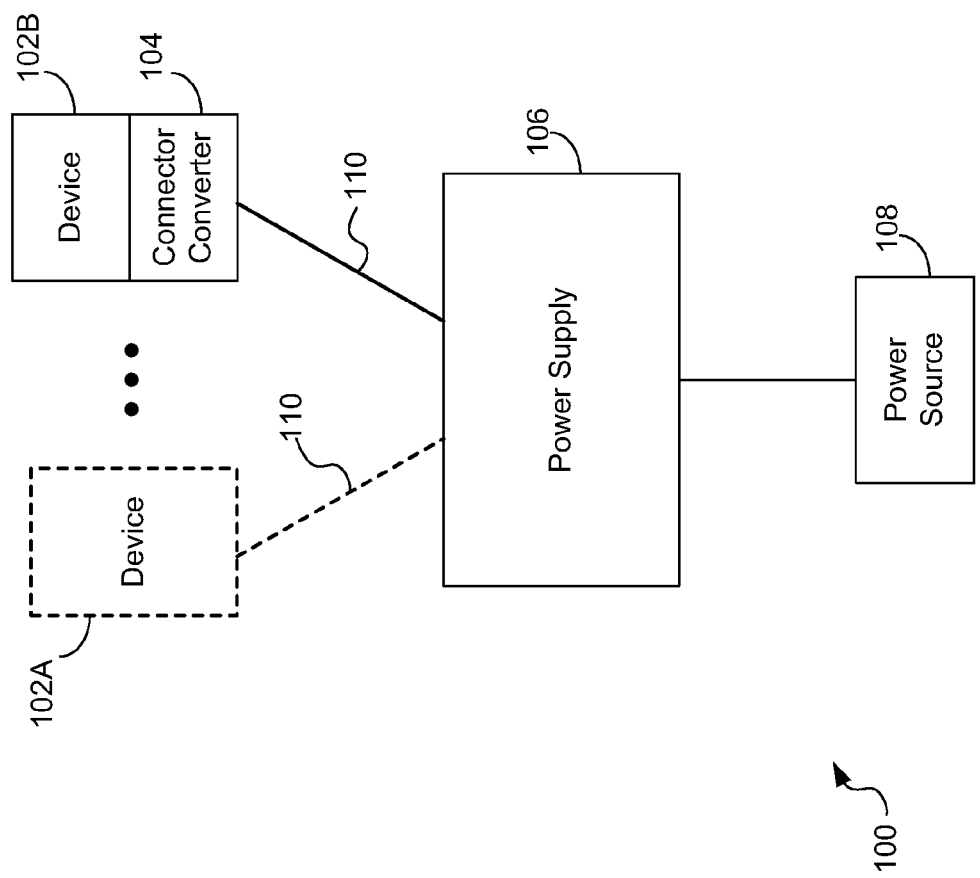
FIG. 1 is a block diagram illustrating a power supply coupled to a power source and electronic devices in accordance with some embodiments.

Reference will now be made in detail to embodiments, examples of which are illustrated in the accompanying drawings. In the following detailed description, numerous specific details are set forth in order to provide a thorough understanding of the present invention(s). However, it will be apparent to one of ordinary skill in the art that the embodiments may be practiced without these specific details. In other instances, well-known methods, procedures, components, and circuits have not been described in detail so as not to unnecessarily obscure aspects of the embodiments.

According to some embodiments, a power supply to provide power for an electrical device includes an input port to receive an input signal, an output port, a first power converter to convert the received input signal to a first electrical signal having a first voltage level, and a second power converter to convert the first electrical signal from the first power converter to a second electrical signal having a second voltage level and provide the second electrical signal having the second voltage level to the output port. The power supply further includes a circuit to selectively bypass the second power converter and provide the first electrical signal having the first voltage level from the first power converter to the output port.

According to some embodiments, a power supply to provide power for a plurality of electrical devices includes an input port to receive AC power; a plurality of output ports to provide DC power; and an AC/DC power converter to convert the received AC power to DC power. The power supply additionally includes a plurality of DC/DC power converters to convert the DC power from the AC/DC power converter to DC power having respective output voltage levels and to provide the DC power having the respective output voltage levels to respective output ports of the plurality of output ports. The power supply also includes a plurality of circuits to selectively bypass respective DC/DC power converters of the plurality of DC/DC power converters and provide the DC power from the AC/DC power converter to respective output ports of the plurality of output ports.

According to some embodiments, a method of operating a power supply to supply power to a load device coupled to an output port of the power supply includes receiving power at a first voltage level, converting the received power at the first voltage level to a power at a second voltage level and providing the power at the second voltage level to an output port of the power supply. The method further includes selectively bypassing the power at the second voltage level being provided to the output port to provide the power at the first voltage level to the output port of the power supply.

According to some embodiments, a method of operating a power supply comprising an AC input, an AC/DC power converter, and a DC/DC power converter includes receiving AC power and determining that a required voltage of a first electrical device to be powered is within a first range of voltage levels available from the AC/DC power converter. In response to the determination that the required voltage of the first electrical device is within the first range, the AC/DC power converter is programmed to convert the received AC power to DC power having a first voltage level corresponding to the required voltage of the first electrical device, and the DC power having the first voltage level is provided to the first electrical device. The method further includes determining that a required voltage and/or power of a second electrical device to be powered is within a second range of voltage and/or power levels available from the DC/DC power converter. In response to the determination that the required voltage and/or power of the second electrical device is within the second range of voltage and/or power levels; the received AC power is converted to DC power using the AC/DC power converter; the DC/DC power converter is programmed to convert the DC power from the AC/DC power converter to DC power having a second voltage level corresponding to the required voltage of the second device; and the DC power having the second voltage level is provided to the second electrical device.

FIG. 1 illustrates architecture 100 for connecting one or more devices 102 to a power supply 106 coupled to a power source 108 in accordance with some embodiments. The power supply 106 may be electrically coupled to the power source 108, from which the power supply 106 receives electrical power to supply to devices 102. The power source may be a source of alternating current (AC) or direct current (DC) voltage. In some embodiments, the power source is a power outlet, such as a wall outlet. The power outlet may provide AC voltage, which is typically 110V in the United States and may be at other voltages outside the United States and/or depending upon local requirements. In other embodiments, the power source is an outlet in an airplane armrest or in an automobile, such as a cigarette lighter socket, which provides 12V DC voltage. In other embodiments, the power source is a motor, generator, battery, and so on that provides electricity. Depending on the particular embodiment, the power supply 106 may be configured for coupling to only a DC power source, only an AC power source, or either a DC or AC power source. The power supply 106 may be coupled to the power source 108 via a power cord, cable, or the like.

In some embodiments, the power supply 106 is connected to multiple devices 102A . . . 102B. In other embodiments, the power supply 106 may be electrically coupled to a single device 102B. The devices 102 may include any of a variety of electronic devices, including but not limited to consumer electronic devices, computer devices and peripherals (e.g., desktop computers, laptop computers, printers, scanners, monitors, laptop docking stations, and so on), portable handheld devices (e.g., video players, still image players, game players, other portable media players, music recorders, video recorders, cameras, other media recorders, radios, medical equipment, calculators, cellular telephones, smart phones, other wireless communication devices, personal digital assistants, programmable remote controls, pagers and so on), small appliances, battery chargers, and power tools. Depending on the particular embodiment, if there are multiple devices 102 coupled to the power supply 106, the devices 102 may be coupled to the power supply 106 independently or in series or in parallel.

In some embodiments, the power supply 106 is a standalone unit, external to and distinct from devices to be powered by the power supply 106. The external power supply 106 may be electrically coupled to one or more devices via a power connection 110 (e.g., power cords, cables, induction, or other known ways of transmitting power). In some embodiments, both the power supply 106 and device 102A conform to a common connector or interface standard; the power connection 110 coupling the power supply 106 to a given device, such as the device 102A includes standardized connectors on one or both ends of the connection, and may, in some embodiments, be non-detachably affixed to the power supply 106. A device may be designed to use the standardized connector and be coupled to the power supply via the power connection 110. In other words, the power supply 106 serves as a universal power supply to any device that is designed to include the standardized connector.

In some embodiments, the power supply 106 and device 102B use different types of power connectors (not shown). For example, a device that is not designed to use the standardized connector (e.g., an older device) may have a power connector that is device or manufacturer specific and not conforming to the standard that is used by the power supply 106. In such embodiments, the power supply 106 may be coupled directly to the device 102B via a cord (not shown) that includes the standardized connector on one end and a device or manufacturer specific connector on the other end. In other words, the cord is customized to the connector on the device because at least one connector on the cord is device or manufacturer specific. The cord may be a multi-functional harness or cord, as will be further described in later sections. Alternatively, an attachment, such as a dongle, may be coupled to the device 102B. The attachment "converts" the connector on the device 102B to the standardized connector utilized by the power supply 106, thereby allowing coupling of the power supply 106 and the device 102B via a cord having the standardized connector on both ends. An example of such a connector converter 104 is shown in FIG. 1.

In some embodiments, the devices 102 connected at the ports of the power supply 106 by connectors 110 may be high-power system loads or low-power system loads. The architecture 100, as will be described in later sections, includes a power supply 106 having the functionality of connecting a device 102 that is either high-power or low-power to the power supply 106. This allows the user to safely connect either a high-power or a low-power system load via connector 110 at any port of the power supply 106. As will be further described in detail, reduction in power dissipation is made possible by bypassing a converter stage and using only a single stage of conversion with the added benefit of only using a single connector. In some embodiments, the power supply 106 may be configured to supply predefined voltages that are different from device to device, or it may supply different voltages at various stages of powering device 102 (e.g., full power, partial power, power save mode, power up mode, power down mode, and so on).

In some other embodiments, the power supply 106 may be integrated with the device 102 as a single unit. For example, the power supply 106 may be the internal power supply of a desktop computer, an audio/visual receiver or preamplifier, a power strip or surge protector, an uninterruptible power supply, or something similar. Furthermore, in some embodiments, other external devices may be electrically coupled to the power supply 106 that is integrated into another device. For example, returning to the example of the power supply 106 integrated with a desktop computer, other external devices may be coupled to the power supply 106 integrated with the desktop computer. Other external devices may include, but are not limited to, computer devices and peripherals (e.g., laptop computers, printers, scanners, monitors, laptop docking stations, and so on), portable hand-held devices coupled to the desktop computer (e.g., video players, still image players, game players, other portable media players, music recorders, video recorders, cameras, other media recorders, radios, medical equipment, calculators, cellular telephones, smart phones, other wireless communication devices, personal digital assistants, programmable remote controls, pagers and so on), and battery chargers. The integrated power supply may supply either high or low power to the desktop computers as well as to the external devices coupled to the desktop computer. The integrated power supply 106 may include multiple ports for connecting multiple devices. In some embodiments, the integrated power supply 106 may include a common connector for coupling to either high or low power external devices at each of the multiple ports as will be further described in later sections.

The power supply 106 may come in a variety of sizes. For example, the power supply 106 may be implemented in a relatively small size for ease of portability and travel convenience. The power supply 106 may also be implemented as a relatively larger power supply size for home, office, or industrial use.

As described above, devices 102 that may be electrically coupled to the power supply 106 may encompass a variety of electronic devices, including but not limited to consumer electronic devices, computer devices, small appliances, battery chargers, power tools, and so on. Some of these devices may include a battery or batteries and some may not. The battery (or batteries) may be rechargeable or non-rechargeable. Examples of rechargeable battery technologies include, but are not limited to, lithium-ion batteries, nickel cadmium batteries, and nickel metal hydride batteries. Examples of non-rechargeable battery technologies include alkaline and lithium batteries. For a device that does not have a battery or that has non-rechargeable batteries, the power supplied by the power supply 106 merely powers the device for operation. For a device that has a rechargeable battery, the power supplied by the power supply 106 powers the device for operation and/or recharges the battery. As it is known in the art, different devices and batteries have different power requirements for operation and/or battery charging. The power supply 106 may supply power at different power requirements ranging from high power to low power. Thus, the power supply 106 needs to know the power requirements of the devices 102, in order to supply the proper amount of power.

Figure 2:
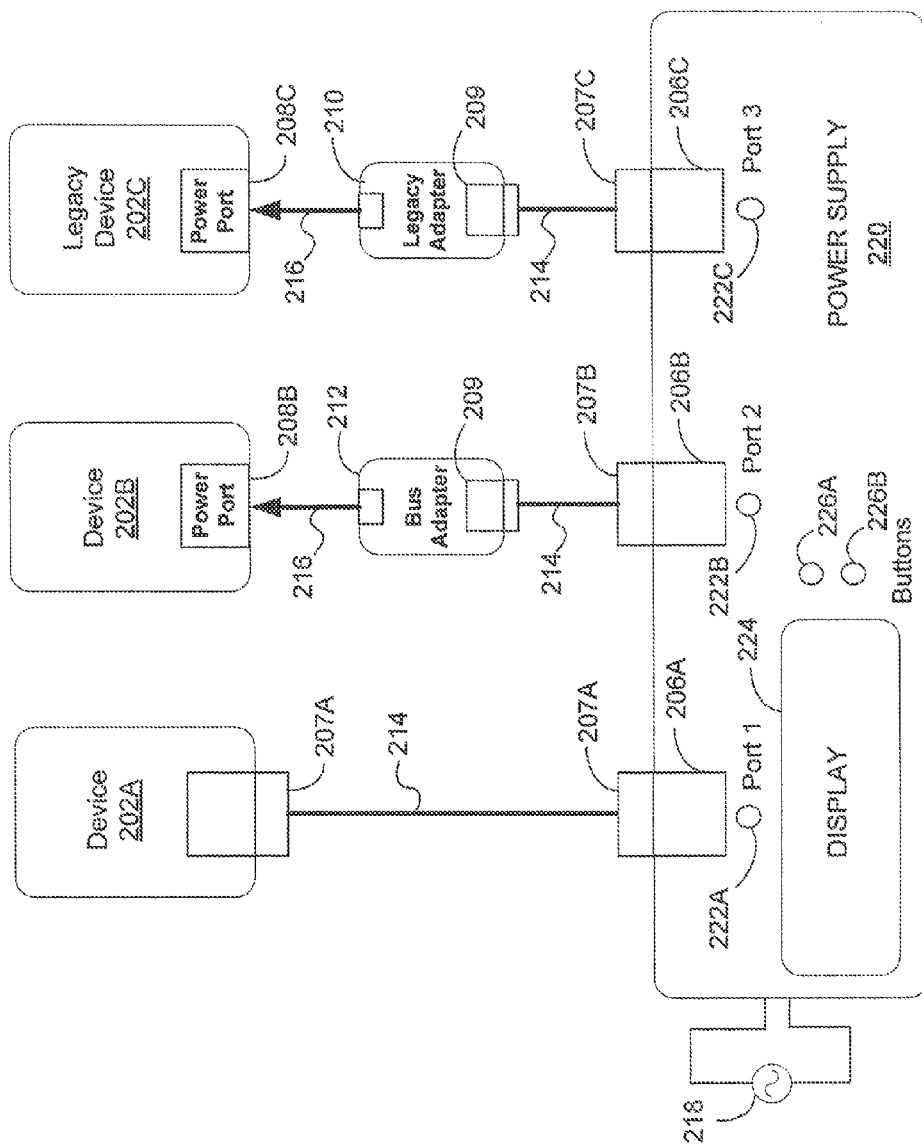
FIG. 2 is a schematic illustrating a multi-port power supply coupled to devices in accordance with some embodiments.

FIG. 2 illustrates a multi-port power supply 220 coupled to devices 202 in accordance with some embodiments. Power supply 220 includes an input for receiving power from a power source 218. Power supply 220 has multiple output ports 206 (e.g., 206A, 206B, and 206C). Output ports 206 can be ports to accommodate any combination of connectors 207 (e.g., 207A, 207B, and 207C), including but not limited to any combination of plugs, receptacles, sockets, magnetic power connectors, non-detachable cables, and so on. In one embodiment, the output ports 206 include a receptacle for receiving multi-purpose power connectors 207. In another embodiment, one or more cables 214 are non-detachably fixed to one or more output ports 206. Power supply 220 may also include a user interface for interaction with a user. In some embodiments, the user interface comprises a status light 222 (e.g., 222A, 222B, and 222C) associated with each output port 206 that may indicate whether a device is being powered, whether the device is being powered by reduced power, or other statuses of power supply 220 or devices 202 connected to the power supply 220. Status lights 222 can indicate one or more statuses by blinking, changing colors, or the like. The user interface of power supply 220 may also include display 224, which may be an LCD screen, an LED, an OLED display, or any other display suitable for displaying information to a user. In some embodiments, status information can be displayed on display 224 in addition to or in place of status lights 222. For example, the background color of display 224 could change colors or blink based on the status of the devices 202 or the power supply 220. In other embodiments, where device 202 includes a display (not shown), power supply 220 may instruct device 202 to display certain information on the display of device 202. The display of device 202 may be an LCD screen, an LED, or an OLED display.

Furthermore, additional information about power supply 220 may be displayed on display 224. The user interface of power supply 220 may also include one or more input device so that a user can interact with power supply 220. Examples of one or more input devices are buttons 226 (e.g., 226A and 226B). Buttons 226 may be used in connection with display 224 to allow a user to access information about power supply 220, any of the attached devices 202, and/or to program or otherwise interact with power supply 220. For example, display 224 may provide information about the operating mode or charge mode of power supply 220, current load and capacity information of each output ports 206 and/or of power supply 220, the current time, and so on. Display 224 may also show information about the devices currently and or previously connected to power supply 220 such as, device identification information, device power requirements, device battery identification information, device battery condition information, and so on. When a battery in device 202 is being charged, display 224 may indicate the amount of time left until the battery is fully charged.

Buttons 226 may also be used to set the operating mode or the charge mode of power supply 220. As shown by buttons 226, it is contemplated that multiple buttons or other control interfaces could be used, for example, to allow a user to more easily interact with power supply 220 or to provide access to more features or information. For example, the user interface of power supply 220 may include multiple control menus each with one or more control functions. In some embodiments, other input devices are used in place of or in conjunction with buttons 226. For example, display 224 could be a touch screen and thus allow input from a user. Other forms of input devices include but are not limited to a scroll wheel, dial, knob, joystick, trackball, and 5-way switch.

In some embodiments, devices 202 may use standardized connector 207A to be coupled to the power supply 220 via cable 214 having the standardized connectors 207A. By using standardized connectors 207A, the power supply 220 can serve as a universal power supply 220 to any device that is designed to include a standardized plug, receptacle or other such connectors. Standardized connector 207A may be any one of, but is not limited to, plugs, receptacles, sockets, magnetic power connectors, non-detachable cables, other universal connectors, and so on. In other embodiments, the power supply 220 and devices 202 may use different types of power connectors. For example, devices 202 that are not designed to use the standard connector 207A may have a device- or manufacture-specific connector that connects to a device- or manufacture-specific power port 208B. The device- or manufacture-specific connector/port may not conform to the standard that is used by the power supply 220. In other embodiments, the device 202B may be connected to the power supply 220 via a bus adapter 212 to convert the connector at port 208B on the device 202B to the standardized connector 207B utilized by the power supply 220. On one end, the bus adapter 212 is coupled to the device 202B by a power cord 216. The power cord 216 may be directly coupled to the device 202B or may include device- or manufacture-specific connectors to connect to the device 202B at the power port 208B. On the other end, the bus adapter 212 is coupled to the power supply 220 by cable 214 having connectors 207B, 209 that conform to the standard used by the power supply 220. In other words, the bus adapter 212 may contain both standard connectors and device-specific connectors, thereby allowing the power supply 220 and the device 202B to be connected by one or more cables 214, 216.

In some embodiments, the device- or manufacture-specific connector/port may be for a legacy device 202C with a legacy port 208C. The legacy port 208C may receive a legacy connector (not shown) to connect to the power supply 220 via cable 214 having a connector 207C on the other end that is different from the legacy connector. In other embodiments, the legacy device 202C may be connected to the power supply 220 via a legacy adapter 210 to convert the connector on the legacy device 202C to the standardized connector utilized by the power supply 220. Similar to the bus adapter 212, the legacy adapter 210 may use a combination of standard and device-specific connectors to connect the legacy device 202C to the power supply 220 via cables 214, 216.

In some embodiments, devices 202 may be high powered, low powered, or a combination of high and low power devices. For example, a high power device may operate at a voltage that ranges from 14V to 25V (DC) while a low power application may require a voltage between 5V to 12V (DC). The power supply 220 includes circuitry that allows for switching between ranges of high or low power at each port such that the same connector at each port 207A-C may be utilized for connecting to both high and low power devices.

Figure 3:
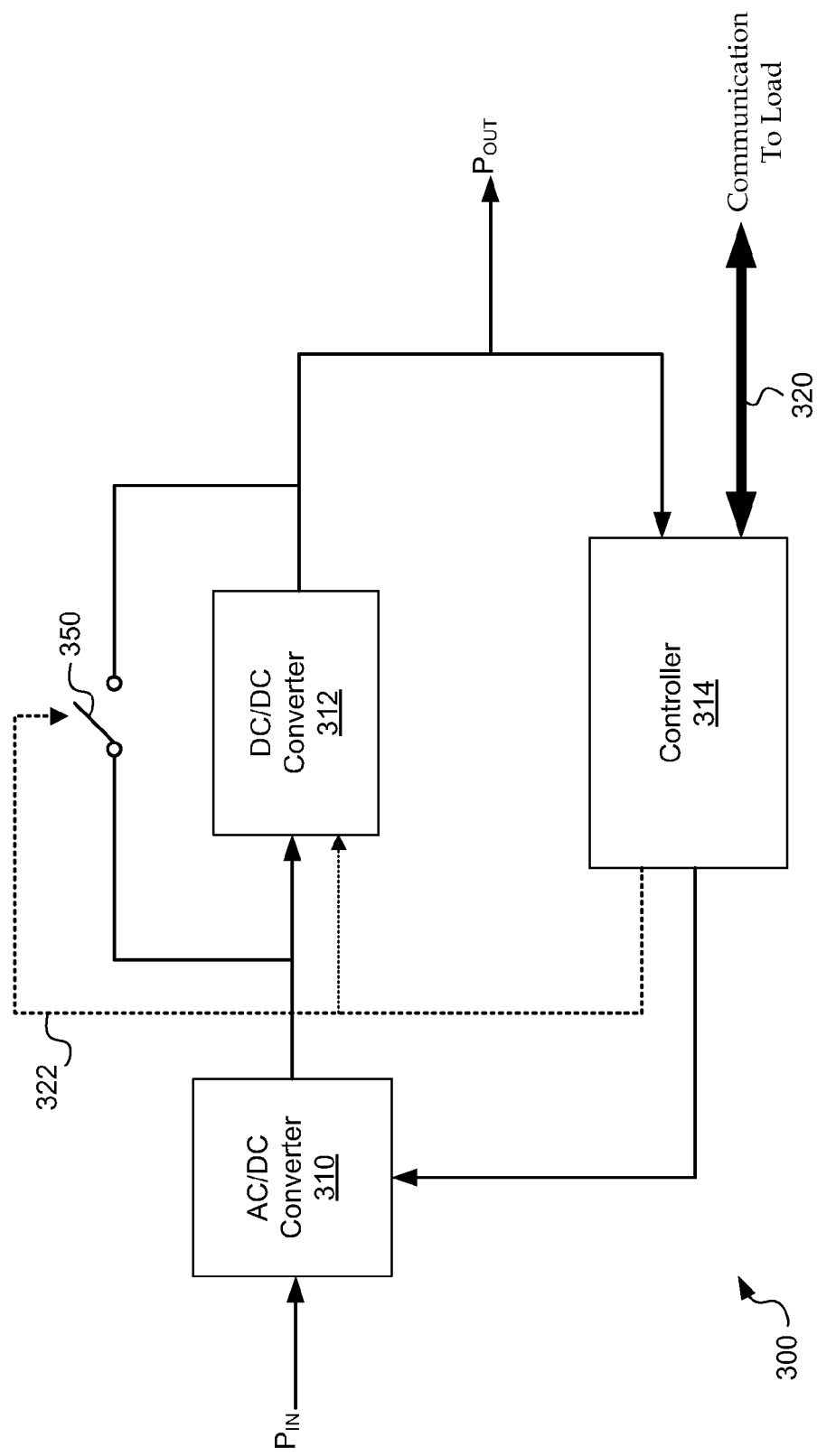
FIG. 3 is a block diagram illustrating a configuration for converting a signal to either high or low power in accordance with some embodiments.

FIG. 3 is a block diagram illustrating a power supply configuration 300 for converting a signal to both high and low power according to some embodiments. The power supply configuration 300 provides power to a system load (an electrical device coupled to receive $P_{OUT}$, not shown), and includes an AC/DC power converter 310, DC/DC power converter 312, and a controller 314. In some embodiments, the power converter 310 may be a DC/DC power converter. The power source $P_{IN}$ may be a source of alternating current (AC) or direct current (DC) power. The AC/DC or DC/DC power converter 310 receives power $P_{IN}$ from a power source (not shown). When $P_{IN}$ is an AC signal, an input port of the AC/DC power converter 310 receives $P_{IN}$ and converts the received signal to a DC signal having a first voltage level for a first level of power applications. The AC/DC or DC/DC power converter 310 may be configured to provide a tunable range of voltages, where the first voltage level may be any voltage within the range of voltages. In other embodiments, when $P_{IN}$ is not an AC signal, the AC/DC converter 310 may be omitted from the configuration 300, may be bypassed, or may act as a connector functioning as an input port for receiving a signal having the first voltage level. In some embodiments, the DC/DC power converter 312 converts the voltage level of the input power $P_{IN}$ to a DC signal having a second voltage level, for a second level of power applications, for example, lower power applications. The second voltage level may be configured to provide any voltage within a range of tunable voltages that is different from the range providing the first voltage level. The DC power having the second voltage level is provided to an output port to supply power $P_{OUT}$ to a connecting low power device (not shown).

The power supply configuration 300 includes circuitry to selectively bypass the DC/DC power converter 312 and provide DC power from the AC/DC or DC/DC power converter 310 to the output port or from the input port directly. In some embodiments, a bypass switch 350, when enabled, allows for signals to bypass the DC/DC converter 312. For example, when a high-power system load is connected, a communication 320 between the controller 314 of the power supply 300 and the connected system load identifies the load as requiring high-power. The controller 314 sends a signal 322 to enable the bypass switch 350, disable the DC/DC converter 312 and cause the input power $P_{IN}$ at the first voltage level to bypass the DC/DC power converter 312 and supply high power to the load.

In the case where a low-power system load is connected, the controller 314 is notified to disable the bypass switch 350. The controller 314 sends a control signal 322 that disables the bypass switch 350, and enabling the low-power DC/DC power converter 312. The DC/DC power converter 312 converts the input power $P_{IN}$ at the first voltage level to a low power at a second voltage level to supply low power to the load. Thus, the configuration 300 may supply both high and low power by controlling the bypass switch 350. When the bypass switch 350 is enabled, the input power $P_{IN}$ bypasses the DC/DC converter 312 to supply power at the first voltage level. When the bypass switch 350 is disabled, the input power $P_{IN}$ is received by the DC/DC converter 312 to supply power at the second voltage level. The configuration 300 is enabled to provide any voltage communicated to the controller 314 by the system load along the high power path, and additional voltages along the low power path. In addition, the AC/DC or DC/DC converter 310 may be enabled to supply a voltage from a tunable range of high voltages such that multiple high and low voltages may be available to the system load.

In some embodiments, if the first voltage level is for high-power applications and the second voltage level is for low-power applications, only a low-power DC/DC converter 312 is needed for providing the low power since the converter 312 no longer has to process high power. Since the DC/DC converter 312 only needs to deliver low-power, its physical size and cost may be reduced. The cost savings come from being able to use only lower power components in the DC/DC converter 312, such as output and input capacitors, power-MOSFET devices and DC-DC power inductors. Therefore, the power supply configuration 300 delivers high-power at reduced power loss, lower manufacturing costs, and a smaller size at any power port.

Figure 4:
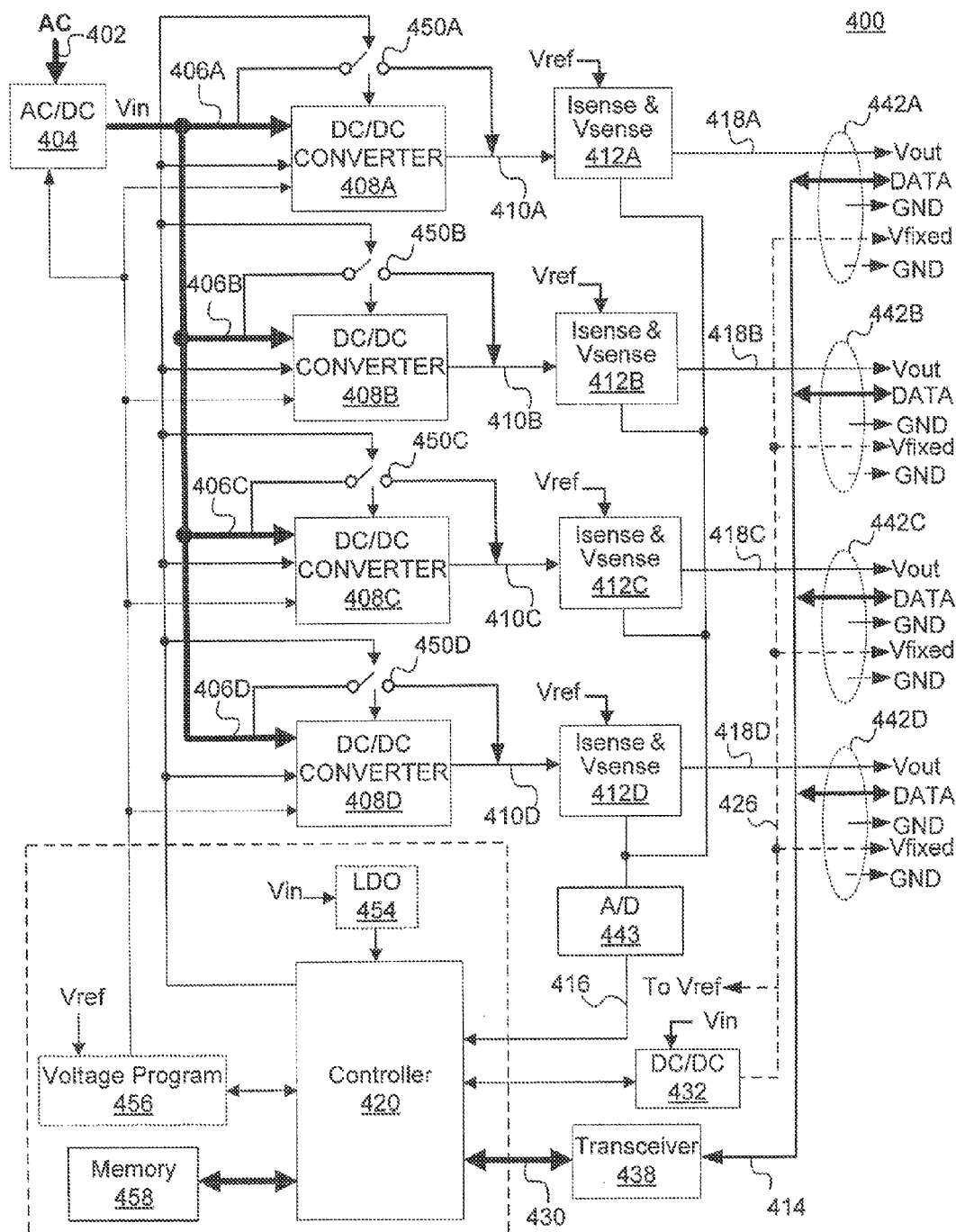
FIG. 4 is a block diagram illustrating a multi-port power supply for supplying power to load devices (not shown) in accordance with some embodiments.

FIG. 4 is a block diagram illustrating a power supply 400 for supplying power to one or more load devices (not shown) in accordance with some embodiments. The power supply 400 acquires information regarding power requirements of a device 102 to be powered by the power supply 400 via communication bus 414 between the power supply 400 and one or more devices connected to the power supply 400 at ports 442A-D. The power supply 400 may be configured to have a single port 442 or multiple ports, such as ports 442A-D. Power information may be digital communications or other data communications exchanged between a controller 420 of the power supply 400 and a load device via a transceiver 438 on the communication bus 414 to enable communication with the respective load device. Based on the power information, the power supply 400 supplies power to the one or more devices, such as devices 102, 202 of FIGS. 1 and 2, in accordance with the specified power requirements.

The power supply 400 may receive either a DC input voltage (e.g., 12 V from an automobile cigar lighter socket) or an AC input voltage (e.g., 110 V or a 220 V from a wall outlet) from a power source (not shown) via conductor line 402. Either AC or DC voltage may be fed through surge protection circuitry/components (not shown) in the power supply 400. The (optional) surge protection circuitry or components, which are well known in the art, may be included in the power supply 400 for protection against power surges or electrical spikes. For illustration purposes, voltage from an AC source is shown in FIG. 4 as being received by the power supply 400 through an AC/DC converter 404 at a first power stage. The AC/DC converter 404 converts voltage from the AC source to a DC voltage $V_{IN}$ for use by the circuitry of the power supply 400 and to generate power for devices such as devices 102, 202. In some embodiments, the AC/DC converter 404 may be configured to provide a tunable range of voltages, so any voltage from a range of voltages may be available.

The input voltage $V_{IN}$ may be fed from the AC/DC converter 404 through a conductor line 406 to various circuitries within the power supply 400. The power supply 400 includes DC/DC converters 408A-D and current or voltage sense circuitry 412A-D, which are configured to supply a predefined voltage to devices such as device 102 via conductor lines 410, 418. In some embodiments, the DC/DC converters 408A-D may be fully programmable and configured to supply predefined voltages that are different from device to device, or it may supply different voltages at various stages of powering device 102 (e.g., full power, partial power, power save mode, power up mode, power down mode, and so on). In other embodiments, the DC/DC converters 408A-D generate a fixed voltage that does not change, but may be controlled to turn on and off. In some embodiments, the current and/or voltage sense circuitry 412A-D monitors levels of the voltage (predefined or fixed) from the respective DC/DC converters 408A-D by providing feedback to processing circuitry, such as controller 420. The current/voltage sense circuitry 412A-D may be used to measure output current and voltage to determine the power states of respectively connected load devices and provide power state information to the controller 420. The controller 420 may make adjustments to the final output voltage to, for example, provide a constant voltage or a constant current via conductor line 418 to connected devices such as device 102 based on the power state information.

In some embodiments, the DC/DC converters 408A-D and the sense circuitry 412A-D are both controlled by the controller 420, directly or indirectly. If the circuits 408, 412 are programmable, they may be digitally controlled power sources that can provide adjustable output values, e.g., voltage or current, through the use of feedback circuitry as shown by conductor line 416. For example, after a digital reference is specified, if the output voltage is too low, a controlling element (such as the DC/DC converter 408 or the sense circuitry 412) may be instructed to increase the voltage to adjust the output. Conversely, if the output voltage is higher than the specified digital reference, the controlling element is instructed to reduce the voltage at the output, thereby adjusting the output values. The A/D converter 443 converts the analog signal sampled by the feedback loop into a digital input for the controller 420. The low dropout regulator (LDO) 454 supplies power to the controller 420.

The controller 420 sends and receives digital communication from devices such as devices 102, 202, via the communication bus 414 and transceiver 438. The controller 420 receives and processes digital messages from the devices such as device 102. In some embodiments, the processing of a digital message from device 102 includes error detection, inspecting the contents of the message, and, based on the contents, executing further instructions. Based on the content of the messages, the controller 420 executes instructions to send responses to the devices such as device 102 via the communication bus 414 and/or provide voltage or current values to the configure the DC/DC converters 408A-D.

In some embodiments, the power supply 400 includes switches 450A-D. One end of each bypass switch 450A-D is coupled to conductor line 406 at the output of the AC/DC converter 404, and the other end of each bypass switch 450A-D is coupled to conductor line 410 at the output of each DC/DC converter 408A-D. The bypass switch 450 may be any component enabled as a switch including, but not limited to a MOSFET (metal oxide semiconductor field effect transistor) or other transistors. Each bypass switch 450A-D provides an alternate conductive pathway from the output of the AC/DC converter 402 to the sense circuitry 412 to bypass the DC/DC converter 408. The switches 450A-D are controlled by the controller 420 to allow the power supply 400 to service either high or low power system loads at each port 442.

When a high power system load is connected to one of the ports 442A-D, the system load communicates to the controller 420 of the power supply 400 via communication bus 414, 430 and transceiver 438 to identify the system load as requiring high power. In some embodiments, the controller 420 programs a voltage program component 456 to configure the AC/DC converter 404 to the voltage needs communicated by the system load to provide the high power. For example, the voltage program 456 may be configured to enable or disable the DC/DC converter 408. The controller 420 may also enable the corresponding bypass switch 450, via the voltage program 456, so that the high power load is properly serviced by the programmed high power of the AC/DC converter 404. The voltage program component 456 may be a function internal to controller 420 or may located external to the controller 420.

When a low power system load is connected to the power supply 400, the controller 420 is informed of the low power needs via communication bus 414, 430 and transceiver 438. The controller 420 configures the voltage program 456 to disable the corresponding bypass switch 450 and enable the DC/DC converter 408 such that the DC/DC converter 408 receives DC power from the AC/DC converter 404 and converts the DC power to low power in accordance with the low power needs of the connected system load. The utilization of a separate high power pathway and using the DC/DC converters 408A-D for servicing only low power loads, simplifies the construction of the DC/DC converters 408A-D. Thus, low power components may be utilized in the DC/DC converters 408A-D, which are typically lower in cost, such as output and input capacitors, power-MOSFET devices, and DC/DC power inductors. The overall size of the DC/DC converters 408A-D may also be reduced since additional components are not needed to provide high power capabilities. Power dissipation may also be reduced by utilizing the DC/DC converters 408A-D some of the time and relying on the single wiring of the bypass switches 450 at other times. Hence provisions for thermal management are simplified, which further reduces cost and size of the power supply 400. Therefore, as the DC/DC converters 408A-D are utilized to only deliver low power, their physical size and costs are also reduced. It will be appreciated that the DC/DC converters 408A-D are not limited to servicing only low power loads, and that in some embodiments the DC/DC converters 408A-D may be configured to service high power loads or a combination of high and low power loads.

As described, the AC/DC converter 404 may be programmed by the voltage program 456 to provide a voltage from a first range of voltage levels. The AC/DC converter 404 may be tunable within the first range of voltage levels. For example, if a high power load, such as a laptop computer, is connected to a port 442 of the power supply 400, the laptop instructs the power supply 400 via communication pathway 414, 430, 438 to provide power at 19V. The voltage program 456 receives instructions from the controller 420 to tune the AC/DC converter 404 to approximately 19V. If 19V is within the first range of voltage levels, the respective DC/DC converter 408A-D is disabled, and the corresponding bypass switch 450 is enabled. Power is transferred directly from the AC/DC converter 404 over the conductive line 406 to conductive line 410 to be received by the sense circuitry 412. The sense circuitry 412A-D measures the power or voltage signal before transmitting to a respective output port 442 of the power supply 400 over conductor line 418, and service the connected laptop computer at the requested power or voltage level.

Similarly, if the 19V is a voltage within a second range of voltage levels or if a different device is connected with a voltage requirement falling within the second range, the voltage program 456 may program the DC/DC converter 408 to output a voltage within the second range of voltages that is at power levels different from the first range. In some embodiments, the DC/DC converter 408 may be enabled to provide a single voltage from a range of voltages, and in other embodiments the range of low voltages may be limited by the range of voltages of the AC/DC converter 404. In some embodiments, the DC/DC converters 408A-D may have the ability to convert-up or converter-down the first range of voltages so the second range of voltages can be lower or higher than a minimum voltage level of the first range of voltages.

In some embodiments, the controller 420 is enabled to control a power-saving mechanism to disable the AC/DC converter 404 and place the power supply 400 at zero or near-zero standby power. For example, when there are no devices coupled to the power supply 400 or if the devices are in a standby or sleep mode, the controller 420 may send instructs to disable the AC/DC converter 404 and disconnect the AC/DC converter 404 from an AC source without having to disconnect the power supply 400 or any load devices connected to the power supply. The disable feature of the AC/DC converter 404 reduces excess power from being wasted due to the power supply 400 being connected to a power source via conductive line 402. Power is conserved merely by disabling the AC/DC converter 404 and/or disconnecting it from an AC source. In some embodiments, the controller 420 may remain activated from an alternate reserve power source, stored internally or externally to the power supply 400, so that the controller 420 remains functional even though the AC/DC converter 404 is disabled. If power again is needed or requested, the controller 420 would be able to quickly re-enable the AC/DC converter 404 from the reserve source to transition the power supply 400 from sleep or standby mode without physically reconnecting or disconnecting any conductive lines or load devices from the power supply 400. Thus, power efficiency is improved without physically turning off or disconnecting the power supply 400 from the AC source. In some embodiments, the controller 420 controls the operation of the AC/DC converter 404 via the voltage program 456.

In summary, several power saving features are implemented in the power supply 400 by utilizing switches 450A-D and the power saving features of the AC/DC converter 404. The controller 420 controls the voltage output of the AC/DC converter 404 to accommodate high power system loads. In some embodiments, the controller 420 controls the output voltage of the AC/DC converter 404 via the voltage program 456. Additionally, the controller 420 (in some embodiments via the voltage program 456) may enable a zero or low power mode of the power supply 400 by utilizing power saving features that may be used to disable or reduce operation of the AC/DC converter 404, some of these features are described in further detail in other sections. The controller 420 may also enable and disable bypass switches 450A-D to supply either high or low power at each port 442 of the power supply 400. Voltage tuning in conjunction with bypass power, and providing for power-saving features improves the overall power conservation of the power supply 400.

The controller 420 may include microprocessors, memory, and other components (not shown) to store and process values, provide feedback information and instructions for configuring the power supply 400. The controller 420 may have access to additional memory 458 to store and process data or for other storage needs. The controller 420 sends and receives digital communications from devices such as devices 102, 202 and configures the power supply 400 to provide the required power parameters such as voltage and current values. In some embodiments, the controller 420 may store a database of predefined power profiles in its local memory or in memory 458. A power profile is a predefined set of data that specifies power requirements, or more particularly, a predefined combination of power requirement parameters. In some embodiments, a power profile includes one or more of the following: a constant voltage value, a constant current value, a wattage value, an upper limit current value, and a battery type. The power profiles may be organized as a lookup table in memory, with each power profile referenced by an identifier. Device 102, 202 may communicate, in a digital message, the identifier of the desired profile to the controller 420. The controller 420 retrieves from local memory or memory 458 the power profile corresponding to the identifier provided by the device 102, 202. Parameters in the retrieved power profile may be used to configure circuits in the power supply 400, such as components 408, 412.

In other embodiments, local memory or memory 458 may include a database of identifiers associated with known vendors of devices or a database of identifiers of devices. Furthermore, in alternative embodiments, the power supply 400 may omit memory entirely. The power supply 400 may accept messages from devices that specify the actual power requirements but not messages identifying a power profile or a battery model. In such embodiments, the device 102, 202 must signal the power requirements directly and not rely on the power supply 400 to determine the power requirements based on merely a power profile identifier or a battery model identifier. In other embodiments, battery database information or identifier database information stored in memory may be automatically updated when an "unknown" device is identified by the power supply. Additionally, in other embodiments, manual updating of database information in memory may occur.

In some embodiments, the power supply 400 may be further configured to receive messages containing proprietary information from a respectively coupled device 102, 202. Device 102, 202 may be configured by its manufacturer to send a message that includes information other than those described above, and a power supply made by or for the same manufacturer may be configured to recognize the information. The information may include data that is typically proprietary or specific to devices of the same manufacturer such as battery charging cycles or data for updating or reconfiguring the power supply. Thus, manufacturers may provide a power supply 400 that can receive, not only generic power requirement information from any device made by any manufacturer and which conforms to the embodiments described above, but also receive proprietary information from devices made by the same manufacturer. In other words, a power supply 400 can be configured to include both universal features and proprietary features. In some embodiments, the device 102, 202 may be a legacy device, and the proprietary information may be for legacy devices. Thus, the power supply 400 includes a legacy DC/DC circuit 432 to provide a fixed voltage supply $V_{Fixed}$ for enabling backwards compatibility with legacy devices such as device 102, 202. The DC/DC circuit 432 generates voltage $V_{Fixed}$ by receiving DC voltage $V_{IN}$ from the AC/DC converter 404 and supplies $V_{Fixed}$ to connected devices such as device 102, 202 over conductor line 426.

Figure 5A:
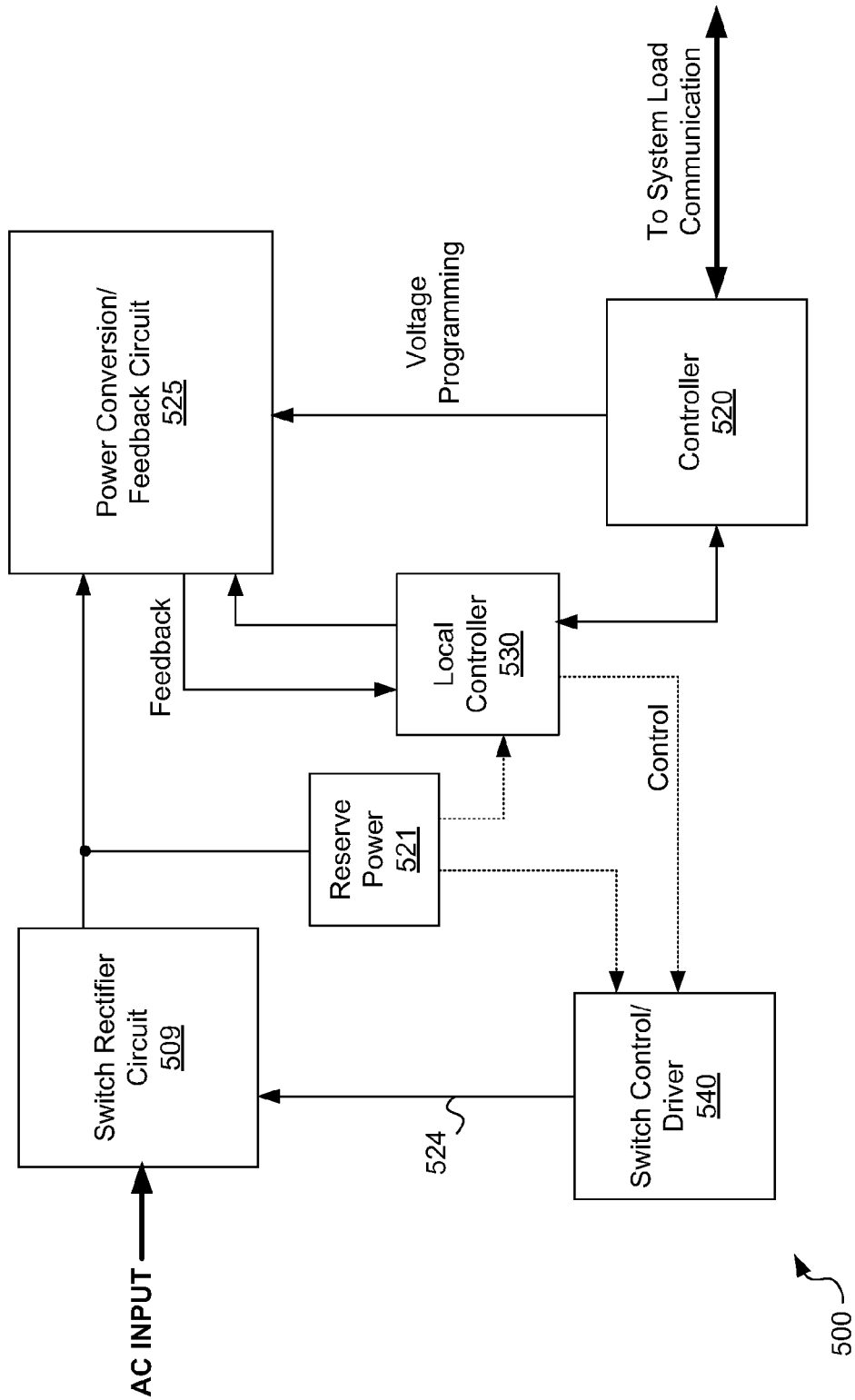
FIG. 5A is a block diagram illustrating components of an AC to DC converter in accordance with some embodiments.

FIGS. 5A-E illustrate components and operation of various AC/DC converters 500, 501, 503 according to some embodiments. It will be appreciated that FIGS. 5A-E share some of the same components, and these components have the same associated reference numbers. The descriptions for such components apply to all FIGS. 5A-5E, and in the interest of brevity their descriptions will not be unnecessarily repeated. FIG. 5A is block diagram illustrating an AC/DC converter circuit 500 that may be utilized as the AC/DC converter 404 of FIG. 4, or may be circuitry found in a power supply in whole or in part, such as power supply 400, according to some embodiments. The AC/DC converter circuit 500 includes a switch rectifier circuit 509 configured to receive an AC input signal from an AC power source (not shown). The switch rectifier circuit 509 may be implemented in any way to convert the AC input to a DC output, including but not limited to a rectifier bridge. The switch rectifier circuit 509, when connected to the AC power source, provides energy to generate an output voltage used to supply power to a system load coupled to the power supply 400. The switch rectifier circuit 509 is configured to rectify the AC input to a DC output, which is subsequently provided to the remaining AC/DC converter circuit 500. The switch rectifier circuit 509 may be implemented in any number of ways, for example, by utilizing switch components (i.e., MOSFETs, etc.) that may be turned on or off to control connectivity of the AC power source to the circuit 500. In some embodiments, the concepts of using switches in the switch rectifier circuit 509 as a method to connect/disconnect from AC power may be applied to a bridgeless PFC (Power Factor Correction) circuit or any other circuits that can interface between AC power and the power conversion to DC power. The switch rectifier circuit 509 may be enabled or disabled by a switch control driver circuit 540. The switch control driver circuit 540 may be controlled by the controller 520 and/or a local controller 530, one or both of which may determine when to enable or disable the rectifier circuit 509.

The switch rectifier circuit 509 and local controller 530 are additionally coupled to a power conversion/feedback circuit 525 configured to convert power and provide feedback to the local controller 530 in a manner such that the local controller 530 may regulate the output voltage of the converter circuit 500. The controller 520, which is also coupled to the power conversion/feedback circuit 525, communicates with the system load to receive requested voltage information and programs the output voltage according to the request by programming the power conversion/feedback circuit 525. The controller 520 and voltage programming of the output voltage are described in detail in later sections.

The AC/DC converter circuit 500 further includes a reserve power component 521 to provide reserve power to various parts of the converter circuit 500 when the rectifier circuit 509 is disabled and placed in a power saving mode. The reserve power component 521 may be configured in any number of ways. Some embodiments of the reserve power component 521 are described in further detail in the next section.

Figure 5B:
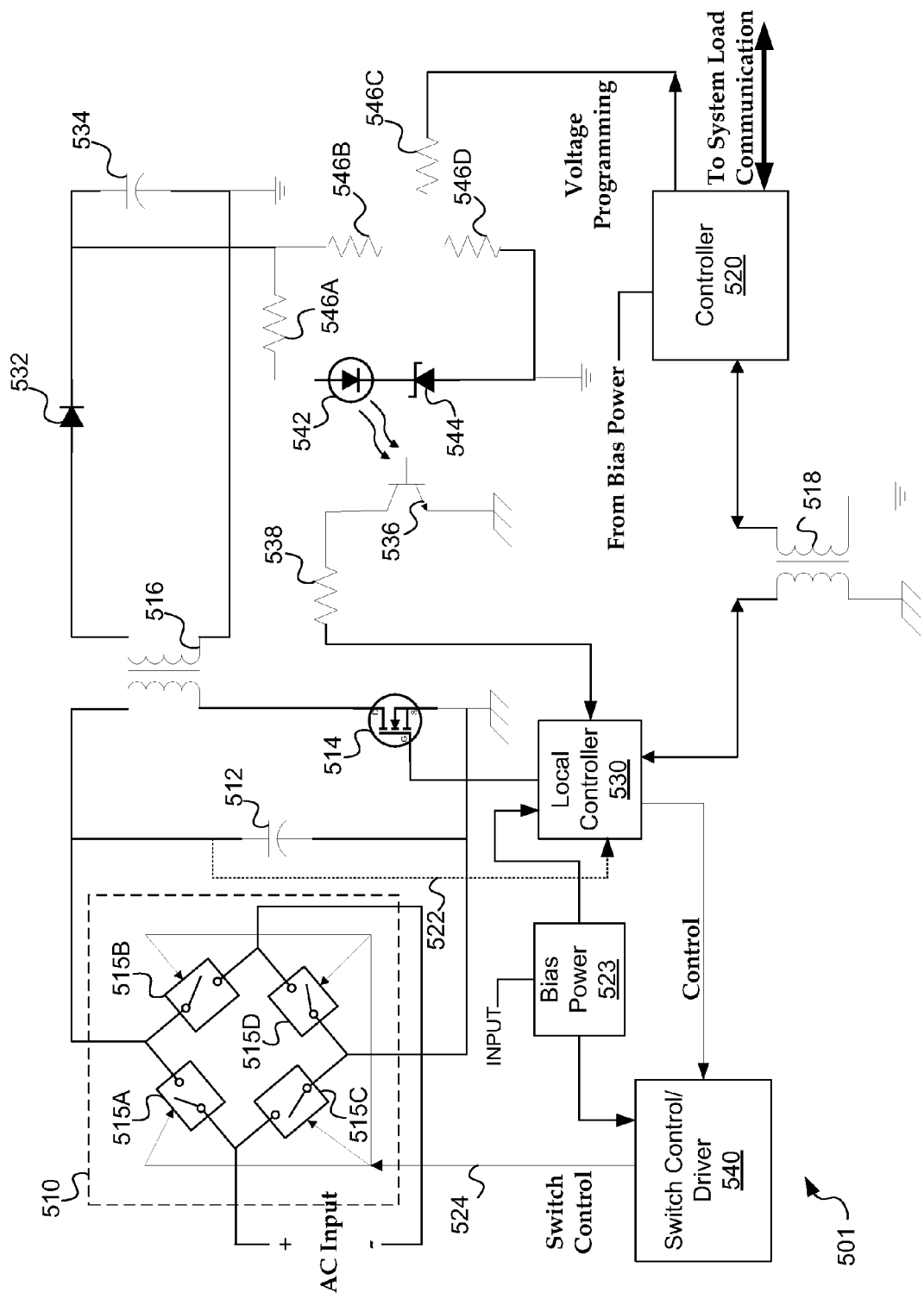
FIG. 5B is a schematic diagram illustrating components of an AC to DC converter in accordance with some embodiments.

FIG. 5B is a schematic diagram illustrating an AC/DC converter circuitry 501, that may be utilized as the AC/DC converter 404 of FIG. 4, according to some embodiments. The converter circuitry 500 includes switches 515A-D in a rectifier bridge 510 that replaces diodes in conventional rectifier bridges typically used in AC/DC converters. The converter circuitry 501 additionally includes a controller 520 for communicating with a system load and a local controller 530 that regulates internal operations of the converter circuitry 501 to provide a desired output voltage. The controller 520 may be controller 420 or some other controller internal to the converter circuitry 501. In some embodiments, the controller 520 and the local controller 530 may be the same component. The switch control/driver 540 is also included that operates the switches 515A-D in response to signals from controllers 520, 530. In some embodiments, the switch controller 540 and the local controller 530 may be the same component. The converter circuitry 501 also includes additional components (resistors 538, 546, transformers 516, 518, capacitor 534, MOSFET device 514, and optoelectrical devices 536, 542, 544) configured to adjust the output voltage in response to a voltage programming control signal from the controller 520 or provide feedback to the local controller 530 for regulating the output voltage generated.

The switches 515A-D may be any type of switch known for this type of application, such as MOSFET switches. The switches 515A-D may be disabled when no load devices are connected to the power supply 400, when the load devices are turned off or in a power saving mode, or when the power supply 400 is in a power-saving mode. A power-saving mode may include any type of power-saving feature in a device that places the device at zero power, near-zero power or a low power state, including, but not limited to placing a device in standby mode, sleep mode, hibernation, and so on. When the switches 515A-D are disabled, an open circuit is created thereby disconnecting the AC input from the remainder of the circuit 501 or power supply 400. In this disconnected state the AC source (not shown) will deliver minimum power to the circuit 501 or power supply 400. In some embodiments, the disconnected state delivers zero power to the circuit 501 or power supply 400. The AC/DC converter 501 is subsequently placed in a power-saving mode so that minimal power is dissipated while the power source is active but while the power supply 400 is not in operation. Conventional AC/DC converters that exclusively use diodes to rectify voltage levels dissipate power. Switches 515A-D (e.g., MOSFET switches) dissipate minimal power when conducting current as compared to diodes, thus power consumption is favorably reduced in addition to providing the function to disconnect from AC power.

In operation, the controller 520 of the converter circuitry 501 receives information from and communicates to one or more system loads. Upon receiving a desired voltage command via the system load communication, the controller 520 outputs a voltage which is imposed on resistor 546C, hence voltage programming, and results in a current being injected through the resistor 546C into the feedback circuitry. This current injected then initializes a signal that propagates through the main voltage feedback loop (components 536-546) and the output voltage is changed to the desired value. The local controller 530 regulates the output voltage via the voltage feedback loop and adjusting the voltage across capacitor 534 via components 516 and 532 to maintain the programmed output voltage.

In some embodiments, communication from the system load to the controller 520 may additionally prompt the controller 520 to signal the local controller 530 and to enable or disable switches 515A-D via switch control/driver 540. For example, the controller 520 may not detect any load devices or may detect that one or more load devices are turned off or in power-saving modes. The controller 520 signals the local controller 530 which then signals the switch control/driver 540 via a control signal to disable switches 515A-D. The switch control/driver 540 disables the switches 515A-D by control signal 524. When the switches 515A-D are turned OFF, the disabled switches 515A-D form an open circuit to disconnect the AC input from the power supply 400 and place the power supply 400 into a power-saving mode. In this power saving mode the AC source (not shown) will deliver minimal power to the power supply as it will be disconnected by switches 515A-D and the power supply will source its energy from capacitor 512 or any type of energy storage device. The switches 515A-D may be enabled again by another control signal via signal path 524 from the switch control/driver 540.

In some embodiments, the controller 520 may maintain a low-power active mode by a reserve power source that may be either external or internal to the circuit 501. In some embodiments, the converter circuitry 501 may include a capacitor 512 or a similar device such as a battery that stores energy to provide bias to the rest of the circuit during a power-saving mode and to allow fast connection to the AC input. The reserve power of the capacitor 512 may power the switch control/driver 540 to enable the switches 515A-D, re-engage the AC input and/or activate the controller 520 and parts of controller 530 even when the rest of the converter circuitry 501 or the power supply 400 is disabled. The activated controllers 520 and 530 are ready to receive communication from a revived or connected system load. In some embodiments, when the energy level of the capacitor 512 becomes too low, the local controller 530 senses the low voltage across the capacitor 512 via Voltage Sense signal 522, alerts switch/ control driver 540 and temporarily turns on the switches 515A-D. In some embodiments local controller 530 may be programmed to temporarily turn on the switches 515A-D at some prescribed time interval without the need for the Voltage Sense signal 522. The capacitor 512 is recharged to allow reserve power to be made available at all times. The controllers 530 and 540 turn off the switches 515A-D once the capacitor 512 is charged. In some embodiments, the converter circuitry 501 includes a separate bias power source 523 for providing bias power separately to the local controller 530 and switch control/driver 540. In some embodiments, the bias power source 523 allows components, such as controller 530, driver 540, and controller 520 to maintain a low-power but active state such that these components may initialize power connection quickly from power-saving modes. In some embodiments, the capacitor 512 operates as a reserve power source for the bias power source 523. It will be appreciated that the capacitor 512 and/or bias power 523 may be components included in the reserve power 521 of FIG. 5A.

Figure 5C:
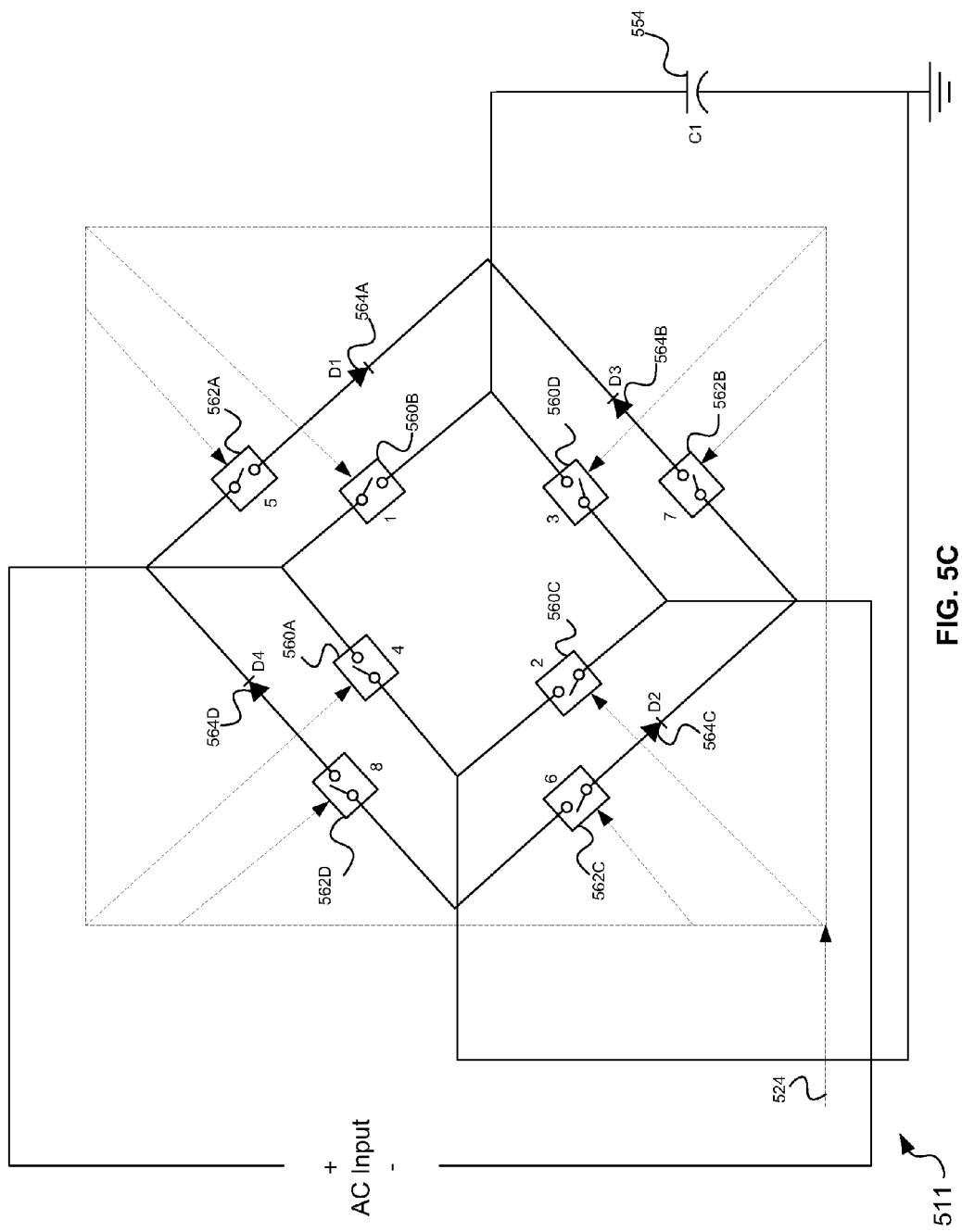
FIG. 5C is a schematic diagram illustrating components of an AC to DC converter in accordance with some other embodiments.

FIG. 5C is a schematic diagram of a switch diode bridge 511, which is another embodiment of rectifier circuit 509. In some embodiments, the switch diode bridge 511 is useful when a Power Factor Correction (PFC) application is a required in a power supply, such as power supply 400. The PFC application adds complexity to the design of the rectifier bridge circuitry, and special care must be taken to ensure that the rectifier bridge, such as the switch diode bridge 511, closely emulates a conventional diode-bridge counterpart such that there are no distortions of the rectified AC current or AC voltage, particularly at the zero-crossing points of the waveform. The combination of active switches 560A-D, 562A-D and diodes 564A-D in the switch diode bridge 511 allows accurate or close to accurate emulation of a conventional diode bridge.

In some embodiments, the switch diode bridge 511 is coupled to a capacitor 554, configured to provide added protection in case of over-voltage conditions. The voltage across capacitor 554 may be monitored to detect undesired voltage conditions. For example, in the event of an over-voltage fault condition on capacitor 554 or any monitored voltage downstream of capacitor 554, the switches 560A-D, 562A-D can be quickly opened by any suitable sensing or automation mechanism, and an over-voltage protection scheme may then be implemented. In some embodiments, any device or circuit other than a capacitor may be utilized, alone or in combination, to allow for the monitoring of undesired conditions to fast-disable or fast-enable switches 560A-D, 562A-D.

In some embodiments, switches 560A-D are utilized to enable conducting high power, and switches 562A-D enable low power. Diodes 564A-D are also low-power diodes. The series connection of the low-power diodes 564A-D and the low-power switches 562A-D are connected in parallel with the high-power switches 560A-D. In operation, the low-power switches 562A-D are turned ON before the zero-crossings occur on the AC input waveform. In this manner the low-power diodes 564A-D naturally commutate as it would occur in a conventional diode-bridge. Before the AC input level is too high, the parallel high-power switches 560A-D turn ON, thereby shunting the low-power devices 562A-D, 564A-D and conducting the high power. A configuration, such as illustrated by example in FIG. 5C, that utilizes both high power switches 560 A-D and low power switches 562A-D with diodes improves power efficiency in the low power range of the active state of the diode bridge 511. It will be appreciated that other configurations or components, as known in the art, may be utilized to achieve similar functionality.

In some embodiments, similar to the rectifier bridge 510, the switches 560A-D may be disabled in the switch diode bridge 511 to place the AC/DC converter circuit 500, 501 in a power saving mode. Upon receiving a disable control signal 524, the switches 560A-D may be turned off, creating an open in the pathway of the switch configuration. The disabled switches 560A-D effectively create an open circuit between the AC input and the power supply 400 to allow for power conservation when the power supply is in a power-saving mode or when the system load is disconnected or off. The AC input may be reconnected to the power supply 400 by re-enabling the switches 560A-D via control signal 524.

In other embodiments, switches 562A-D or any combination of switches 560A-D and 562A-D may be similarly disabled to place the converter circuitry 500 of FIG. 5A or any system utilizing the switch diode bridge 511 into a power saving state. It will be appreciated that other configurations or components, as known in the art, may be utilized to achieve similar functionality. For example, a control switch (not shown) external to the switch diode bridge 511 (or alternatively another diode bridge configuration) may be enabled or disabled instead of switches 560A-D or 562A-D to place the system in a power saving mode.

Figure 5D:
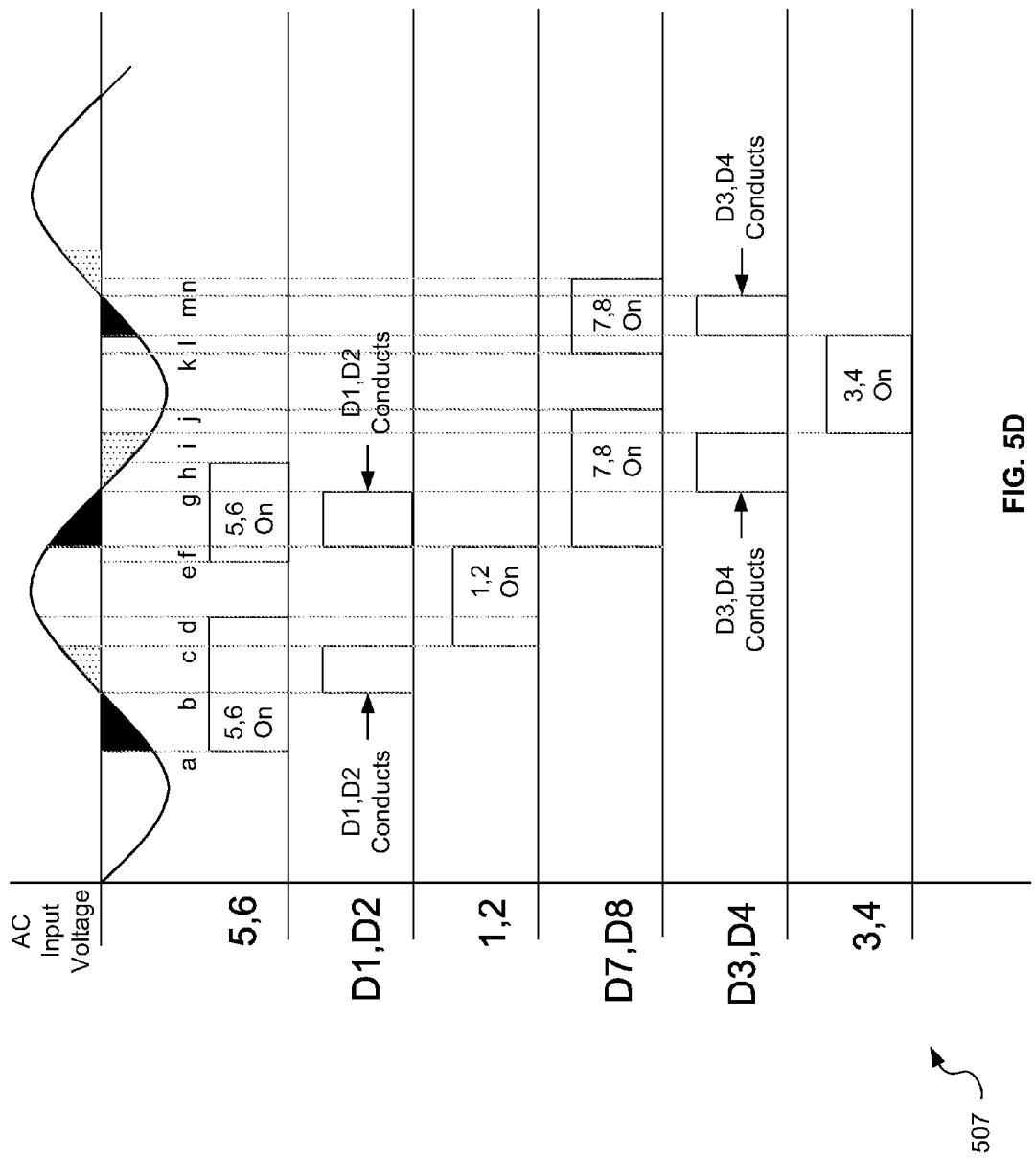
FIG. 5D is a timing diagram illustrating the operation of components of the AC to DC converter of FIG. 5C in accordance with some embodiments.

FIG. 5D is a timing diagram of the operation of the switch diode bridge 511 according to some embodiments. At point "a", during the negative cycle of the AC input waveform, low-power switches 562A ("5") and 562C ("6") are turned ON. Additionally, series diodes 564A ("D1") and 564C ("D2") are reverse-biased, thus no conduction takes place. As the AC waveform reaches line "b", the signal transitions to a positive polarity, and diodes 564A ("D1") and 564C ("D2") begin to conduct. In doing so the zero-crossing transition at line "b" naturally commutates diodes 564A ("D1") and 564C ("D2") as it would occur in a conventional diode-bridge. At some predetermined point "c", high-power switches 560B ("1") and 560C ("2") are turned ON and begin to conduct current towards a high-power level. The low-impedance path of low-power switches 560B ("1") and 560C ("2") will in effect shunt-out the series combination of switch 562A ("5")/diode 564A ("D1") and switch 562C ("6")/diode 564C ("D2") respectively. Soon after high-power switches 560B ("1") and 560C ("2") are turned ON, the low-power switches 562A ("5") and 562C ("6") turn OFF as shown as line "d".

As the AC input waveform crosses its peak value and begins to decrease toward a negative transition low-power switches 562A ("5") and 562C ("6") are again turned ON shown by line "e". Shortly thereafter high-power switches 560B ("1") and 560C ("2") are turned OFF and diodes 564A ("D1") and 564C ("D2") begin to conduct at low power levels shown by line "f". It will be appreciated that, in some embodiments, the low-power switches 562A ("5") and 562C ("6") may remain activated by leaving them ON from the time of line "a" to line "h". The process repeats itself during the negative half-cycle of the AC input waveform with respect to high-power switches 560D ("3") and 560A ("4"), low-power switches 562B ("7") and 562D ("8"), and diodes 564B ("D3") and 564D ("D4").

Figure 5E:
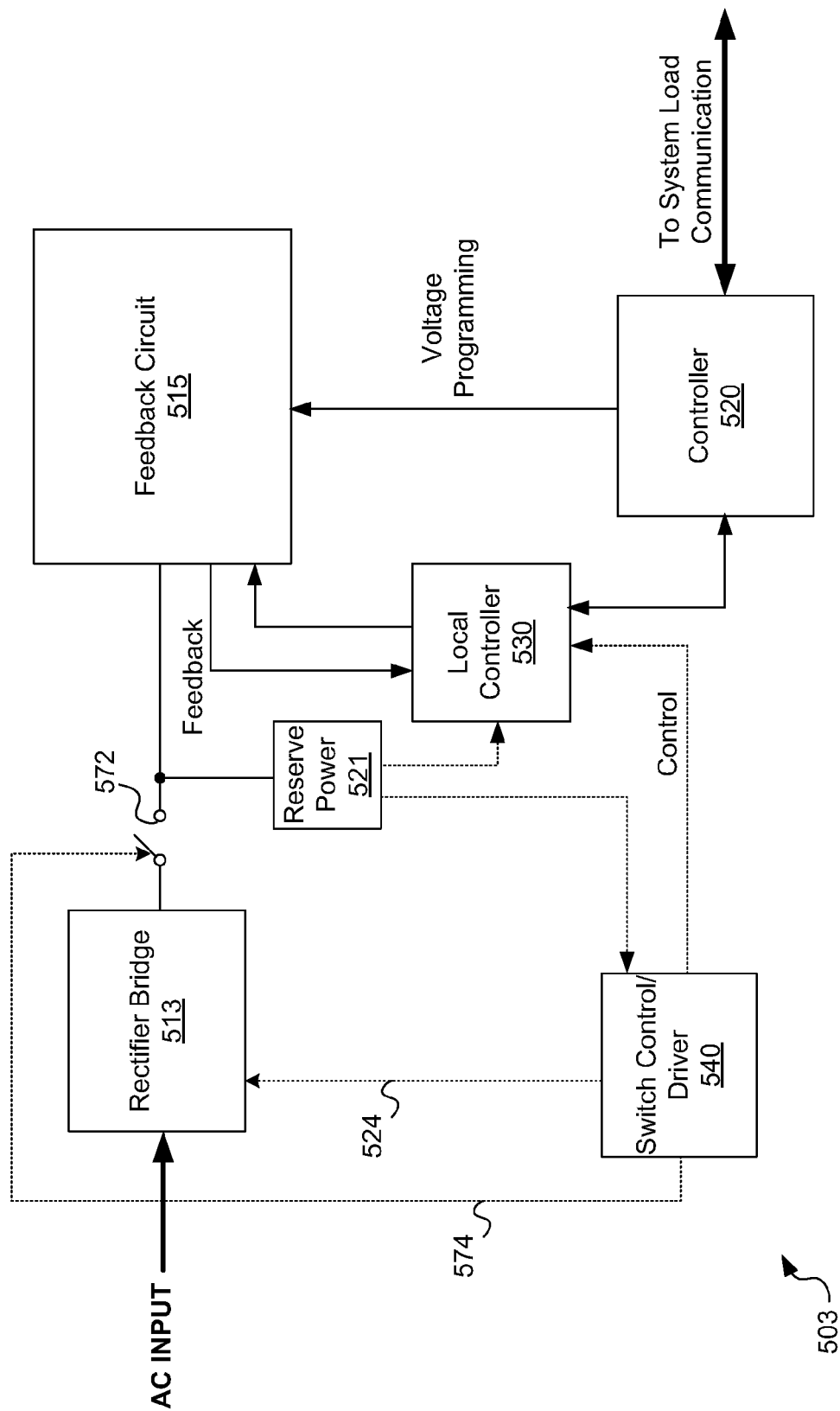
FIG. 5E is a block diagram illustrating components of an AC to DC converter in accordance with some other embodiments.

FIG. 5E is block diagram illustrating an AC/DC converter circuit 503 that may be utilized as the AC/DC converter 404 of FIG. 4, according to some embodiments. The AC/DC converter circuit 503 includes a rectifier bridge 513 and a switch 572 between the rectifier bridge 513 and the power conversion/feedback circuit 515. In some embodiments, the switch 572 may be disabled, for example during a power-saving mode, such that the AC input may be disconnected from the rest of circuit 503, and thereby effectively disconnecting the AC input from the power supply 400. The switch control/driver 540 controls the switch 572 via a control signal 574 to turn the switch 572 ON or OFF. In some embodiments, the rectifier bridge 513 is a conventional rectifier bridge containing only diodes and no switch components in place of the diodes. In some embodiments, the rectifier bridge 513 may include switches or a combination of switches and diodes, similar to the rectifier circuits 509-511 described in previous sections.

Some embodiments of AC/DC converter applications, such as the AC/DC converter circuits 500, 501 in the power supply 400, may utilize the rectifier circuit 510 configuration. In other embodiments, converter circuits 500, 501 may utilize the switch diode bridge 511 depending on particular design constraints. For example, in the case of the rectifier circuit 510 the control for switches 515A-D may be used to emulate the patterning of a conventional diode bridge. Therefore, the complexity of the switch control/driver 540 for operating the switches 515A-D is preferred to achieve the proper synchronization and control of the respective switches 515A-D. In the case of the switch diode circuit 511, the complexity is focused on the switch diode circuit 511, such that the switch control/driver 540 may be simplified with reduced controlling capabilities, which is more forgiving in the inaccuracy for control of the switches 560A-D, 562A-D. In some embodiments, a subset of switches 515, 560, 562 may be controlled to enable or disable the circuits 510, 511 respectively. It will be appreciated, that any combination of components, sub-components, or functionality of components of circuits 500, 501, 511, 503 in FIGS. 5A-5E may be implemented.

Figure 6:
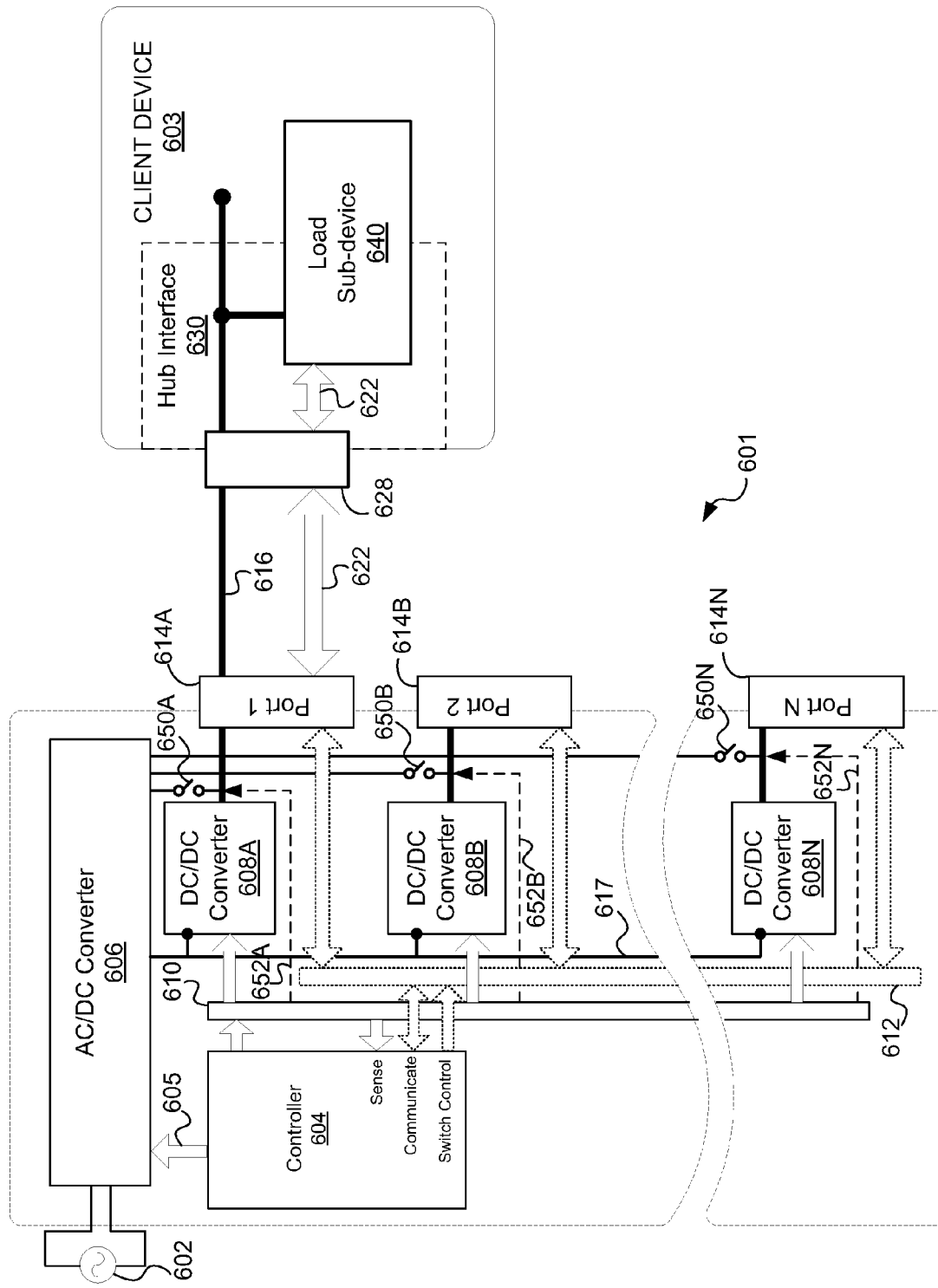
FIG. 6 is a block diagram illustrating a power supply coupled to provide power to a load device in accordance with some embodiments.

FIG. 6 is a block diagram illustrating a power supply 601 coupled to supply power to a client device 603 in accordance with some embodiment. Similar to the power supply 400 of FIG. 4, the power supply 601 includes an AC/DC converter 606 for receiving a voltage from a power source, such as an AC source 602 and converting the AC voltage to DC voltage for use by devices coupled to ports 614A-N, such as a device that includes client device 603. The power supply 601 also includes DC/DC converters 608A-N for each respective port 614 to service a correspondingly connected device such as client device 603. The DC/DC converter 608 supplies voltage to respectively connected devices such as client device 603 on power line 616. In some embodiments, the DC/DC converter 608 may supply different voltages from device to device or make adjustments to provide varying voltages to the same device depending on power requirements or changes to the power requirements. In some embodiments, the DC/DC converter 608 may provide a legacy fixed voltage to supply a fixed voltage to client device 603 when the client device 603 is a legacy device.

In some embodiments the AC/DC converter is connected to the DC/DC converters 608A-N via power conductor 617. In some embodiments, switches 650A-N are coupled to the AC/DC converter 606 and respective power line 616 at each port 614A-N. Similar to switches 450A-D of FIG. 4, switches 650A-N allow for power signals to bypass the DC/DC converter 608 depending on the power needs of the connected client device 603. When the client device 603 is a high-power system, power from the AC/DC converter 606 is directly utilized by enabling the respective switch 650 and disabling the respective DC/DC converter 608 to output the higher power of the AC/DC converter 606 for the client device 603. When the client device 603 is a low-power system, the respective switch 650 is disabled and the respective DC/DC converter 608 is enabled for the normal operation of the DC/DC converter 608 converting a high DC power to a low DC power to service the lower powered client device 603. Thus, each of the ports 614A-N is enabled to service either a high or low power system. Separating the high-power pathway and the low-power pathway by a simple switch reduces power dissipation and allows for simplified circuitry, resulting in an overall low-cost, smaller-sized power supply 601.

In some embodiments, the power supply 601 includes a controller 604 for programming and regulating various circuitry in the power supply 601 and communicating with the one or more connected devices. Generally, as in the power supply 400 of FIG. 4, these are controlled power sources that can provide adjustable output values, e.g., voltage or current, through the use of a feedback system via a communication line 612. The communication line 612 communicates to connected devices by sending and receiving power requirement information. The controller 604 sends and receives digital communication from devices such as client device 603 via the communication line 612. The controller 604 receives and processes digital messages from the client devices 603. The controller 604 is also coupled to the DC/DC converters 608 via control line 610 to configure the DC/DC converters 608 and make adjustments to the supplied power. The controller 604 is additionally coupled to switches 650A-N via control line 610 and to the AC/DC converter 606 via another control connection 605. Thus, the controller 604 enables or disables switches 650A-N by control signals 652A-N and the DC/DC converters 608A-N via the conductor line 610 depending on whether the client device 603 is a high or low power system. As previously described, the controller 604 may additionally have tunable control of voltage levels of the AC/DC converter 606 to match power requirements of high-power client device 603. The controller 604 may also enable or disable switches within the AC/DC converter 606, as described with respect to FIG. 5, to place the AC/DC converter 606 in a standby mode for additional power saving features. The controller 604 may include microprocessors, memory, power supply hub and other components (not shown) for storing and processing values, feedback information and instructions to configure the power supply 601. In some embodiments, the processing of a digital message from a client device 603 includes error detection, inspecting the contents of the message, and based on the contents, executing further instructions. Based on the content of the messages, the controller 604 executes instructions to send responses to the client devices 603 via the communication line 612 and/or provides voltage or current values to program the DC/DC converters 608, via conductor line 610.

In some embodiments, the controller 604 includes a sense detection mode, which detects the connection of the client device 603 or whether the client device 603 is high or low powered. In some embodiments, the controller 604 includes a communicate mode during which data is transmitted and received on communication line 612, and subsequently on communication line 622 to and from the client device 603. In some embodiments, the controller 604 also includes a switch control mode to send control signals to enable or disable switches in AC/DC converter 606, switches 650A-N or the DC/DC converters 608A-N for enhanced power saving features and service both high and low powered client devices 603 as previously described.

In some embodiments, the controller 604 includes memory (not shown) to store a database of predefined power profiles. A power profile is a predefined set of data that specifies power requirements, or more particularly, a predefined combination of power requirement parameters. In some embodiments, a power profile includes one or more of the following: a constant voltage value, a constant current value, a wattage value, an upper limit current value, and a battery type. The power profiles may be organized as a lookup table in memory, with each power profile referenced by an identifier. A device such as client device 603 may communicate, in a digital message, the identifier of the desired profile to the controller 604. The controller 604 retrieves from memory the power profile corresponding to the identifier provided by the client device 603. Parameters in the retrieved power profile are used to configure the power supply 601.

The client device 603 may include a hub interface 630 having components to interface with the power supply 601 through Port 1 614A and device port 628. The client device 603 communicates power requirements via communication lines 622 to allow the power supply 601 to establish whether the client device 603 requires high or low power and further adjust the appropriate power level. Once the power requirements of the client device 603 are determined, the proper power is configured on the power line 616 to fully power the client device 603. In some embodiments, the client device 603 includes a load sub-device 640, which may include a load processor, memory, power-saving circuitry and other components to collaborate with the power supply 601 and communicate various power needs of the client device 603.

Figure 7:
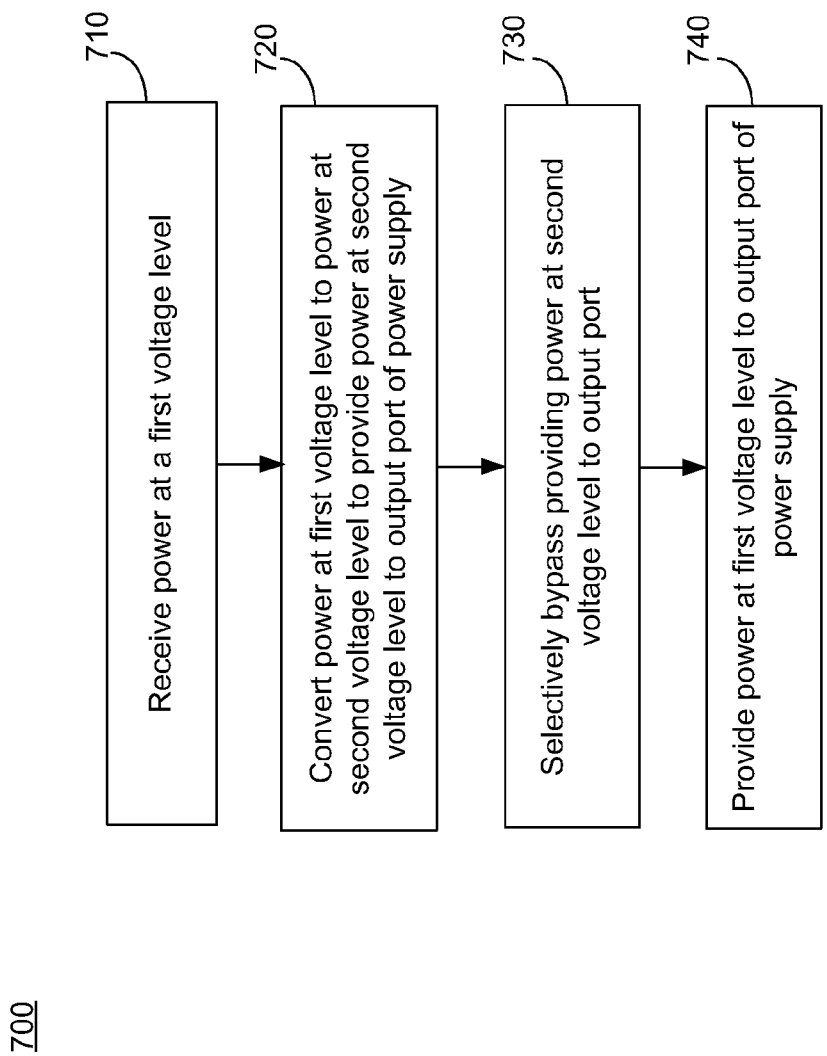
FIG. 7 is a flow diagram illustrating a process of a power supply supplying power to a connected device in accordance with some embodiments.

FIG. 7 is a flow diagram illustrating a process 700 of a power supply supplying power to a connected device in accordance with some embodiments. At step 710, the power supply receives power at a first voltage level. At step 720, the received power at the first voltage level is converted to a power at a second voltage level to provide the power at the second voltage level to an output port of the power supply. In some embodiments, at step 730, the power at the second voltage level provided to the output port is selectively bypassed, at step 740, to provide the power at the first voltage level to the output port of the power supply.

Figure 8:
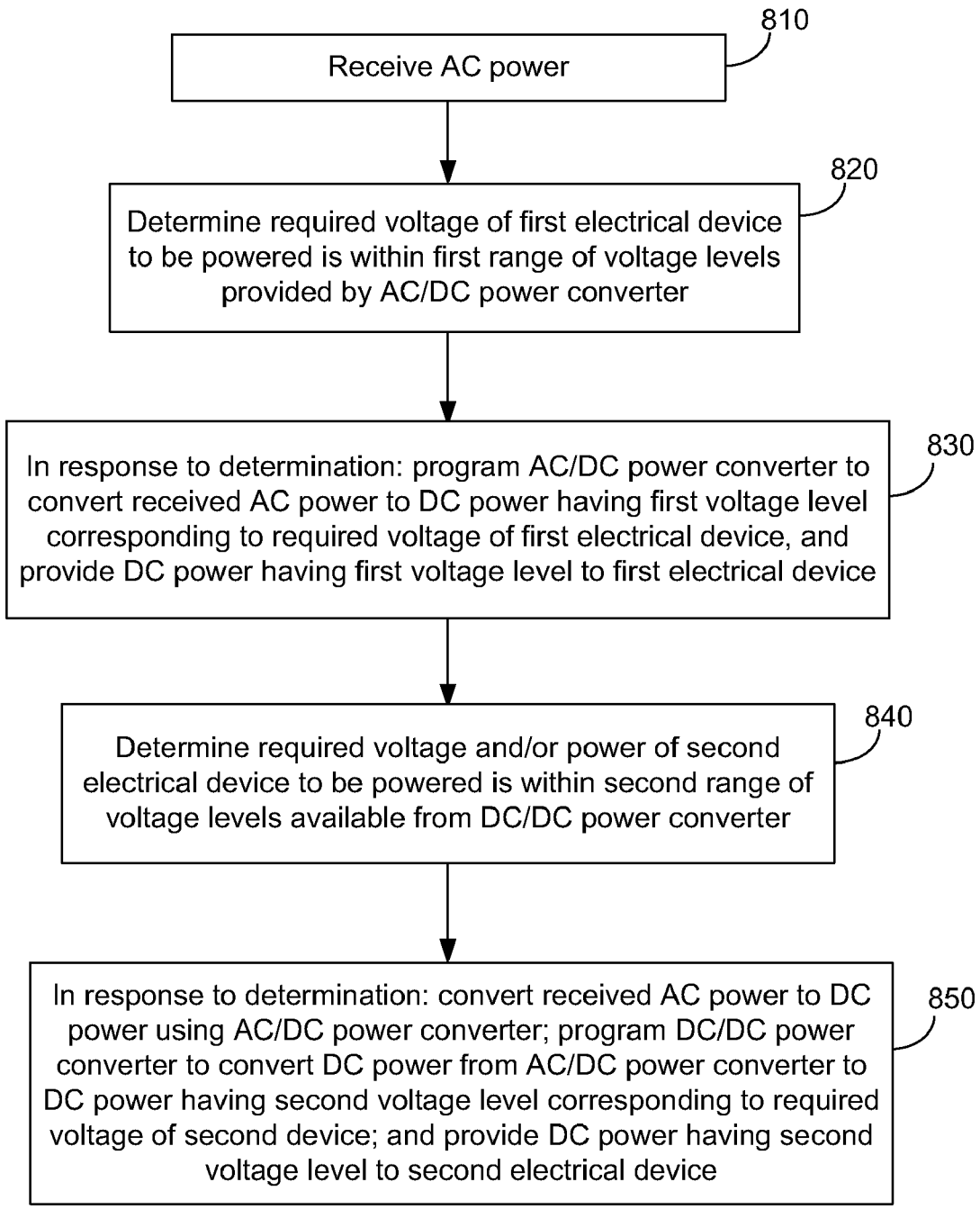
FIG. 8 is a flow diagram illustrating a process of a power supply supplying power to more than one connected device in accordance with another embodiments.

FIG. 8 is a flow diagram illustrating a process 800 of a power supply supplying power to more than one connected device according to some embodiments. At step 810, a power supply comprising an AC input, an AC/DC power converter, and a DC/DC power converter receives AC power. At step 820, a required voltage of a first electrical device to be powered is determined within a first range of voltage levels provided by the AC/DC power converter. In response to the determination that the required voltage and/or power of the first electrical device is within the first range, at step 830: the AC/DC power converter is programmed to convert the received AC power to DC power having a first voltage level corresponding to the required voltage and/or power of the first electrical device; and the DC power having the first voltage level is provided to the first electrical device. At step 840, a required voltage of a second electrical device to be powered is determined within a second range of voltage and/or power levels available from the DC/DC power converter. At step 850, in response to the determination that the required voltage of the second electrical device is within the second range of voltage and/or power levels: the received AC power is converted to DC power using the AC/DC power converter; the DC/DC power converter is programmed to convert the DC power from the AC/DC power converter to DC power having a second voltage level corresponding to the required voltage and/or power of the second device; and the DC power having the second voltage level is provided to the second electrical device.

Figure 9:
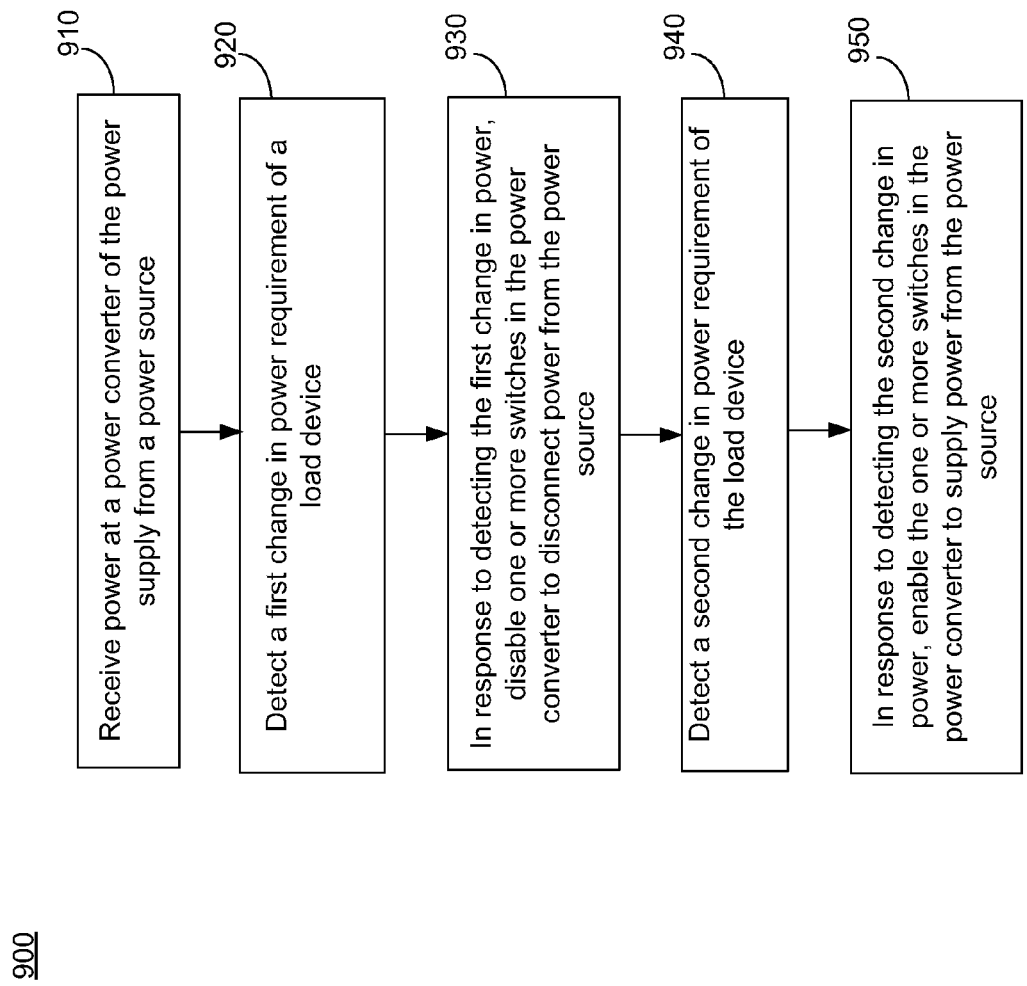
FIG. 9 is a flow diagram illustrating a process of a converter in a power supply coupled to a power source in accordance with some embodiments.

FIG. 9 is a flow diagram illustrating a process 900 of a converter in a power supply coupled to a power source in accordance with some embodiments. At step 910, a power converter of the power supply receives power from a power source. At step 920, a first change in a power requirement of the load device is detected. In response to detecting the first change in power, at step 930, one or more switches in the power converter is disabled to disconnect power from the power source. At step 940, a second change in the power requirement of the load device is detected. In response to detecting the second change in power, at step 950, the one or more switches in the power converter to supply power from the power source is enabled.

A power supply to provide power for an electrical device comprises an input port to receive an input signal and an output port coupled to the electrical device to provide an output signal. The power supply includes a first power converter to convert the received input signal to a first electrical signal having a first voltage level and a second power converter to convert the first electrical signal from the first power converter to a second electrical signal having a second voltage level, and provide the second electrical signal to the output port as the output signal. The power supply further includes a circuit to selectively bypass the second power converter and provide the first electrical signal from the first power converter to the output port as the output signal.

The circuit to selectively bypass the second power converter comprises a switch. In some embodiments the switch comprises a metal-oxide-semiconductor field-effect transistor (MOSFET) and could be other devices that perform the function of a switch.

The power supply further comprises control circuitry, coupled to the circuit to selectively bypass the second power converter, to provide a control signal to selectively bypass the second power converter. The control circuitry is coupled to the second power converter to provide a disable signal to the second power converter when the second power converter is bypassed. The control circuitry is coupled to the second power converter to provide an enable signal to the second power converter when the second power converter is not bypassed. The first power converter is programmable to vary the first voltage level within a first range of voltages, and the second power converter is programmable to vary the second voltage level within a second range of voltages. The second power converter has the ability to convert-up or converter-down the first range of voltages so the second range of voltages can be lower or higher than a minimum voltage level of the first range of voltages. The control circuitry comprises programming circuitry to provide a first programming signal specifying the first voltage level to the first power converter and a second programming signal specifying the second voltage level to the second power converter.

The control circuitry comprises comparison circuitry to determine whether a required voltage of an electrical device coupled to the output port is within the first range of voltages or the second range of voltages; and programming circuitry to provide a first programming signal to the first power converter to program the first voltage level to the required voltage in response to a determination that the required voltage is within the first range of voltages and to provide a second programming signal to the second power converter to program the second voltage level to the required voltage in response to a determination that the required voltage is within the second range of voltages. The control circuitry further comprises a communication interface to receive a signal specifying the required voltage of the electrical device coupled to the output port. The communication interface is configured to receive the signal specifying the required voltage via the output port. The control circuitry comprises a microcontroller.

The second power converter comprises a step-down power converter. The second power converter is configured to provide both step-down and step-up power conversion. The first power converter is an AC-DC power converter, the second power converter is a DC-DC power converter, and the output signal is DC power. The power supply further comprises an additional output port to provide DC power; an additional DC-DC power converter to convert the DC power having the first voltage level to DC power having a third voltage level and to provide the DC power having the third voltage level to the additional output port; and an additional circuit to selectively bypass the additional DC-DC power converter and provide the DC power having the first voltage level to the additional output port.

A power supply/adapter to provide power for an electrical device comprises an input port to receive AC power, an output port to provide DC power, and an AC-DC power converter to convert the received AC power to DC power having a first voltage level. The power supply/adapter also comprises a DC-DC power converter to convert the DC power from the AC-DC power converter to DC power having a second voltage level and to provide the DC power having the second voltage level to the output port and a circuit to selectively bypass the DC-DC power converter and provide the DC power from the AC-DC power converter to the output port.

A power supply to provide power for a plurality of electrical devices comprises an input port to receive AC power, a plurality of output ports to provide DC power, an AC-DC power converter to convert the received AC power to DC power having a first voltage level, and a plurality of DC-DC power converters to convert the DC power from the AC-DC power converter to DC power having respective output voltage levels and to provide the DC power having the respective output voltage levels to respective output ports of the plurality of output ports. The power supply also comprises a plurality of circuits to selectively bypass respective DC-DC power converters of the plurality of DC-DC power converters and provide the DC power from the AC-DC power converter to respective output ports of the plurality of output ports.

A respective circuit of the plurality of circuits to selectively bypass respective DC-DC power converters comprises a switch. The power supply further comprises control circuitry, coupled to the plurality of circuits to selectively bypass respective DC-DC power converters, to provide control signals to selectively bypass respective DC-DC power converters.

The control circuitry is coupled to the plurality of DC-DC power converters to provide disable signals to respective DC-DC power converters when the respective DC-DC power converters are bypassed. The control circuitry is coupled to the plurality of DC-DC power converters to provide enable signals to respective DC-DC power converters when the respective DC-DC power converters are bypassed.

The AC-DC power converter is programmable to vary the first voltage level within a first range of voltages, and the plurality of DC-DC power converters are programmable to vary the respective output voltage levels within a second range of voltages. The second range of voltages is lower than a minimum voltage level of the first range of voltages.

The control circuitry comprises programming circuitry to provide a first programming signal specifying the first voltage level to the AC-DC power converter and a plurality of respective programming signals specifying the respective output voltage levels to respective DC-DC power converters. The control circuitry comprises comparison circuitry to determine whether a required voltage of an electrical device coupled to a respective output port is within the first range of voltages or the second range of voltages; and programming circuitry to provide a first programming signal to the AC-DC power converter to program the first voltage level to the required voltage in response to a determination that the required voltage is within the first range of voltages and to provide a second programming signal to a respective DC-DC power converter corresponding to the respective output port to program the respective output voltage level to the required voltage in response to a determination that the required voltage and/or power is within the second range of voltages and/or power.

The control circuitry further comprises a communication interface to receive a signal specifying the required voltage of the electrical device coupled to the respective output port. The communication interface is configured to receive the signal specifying the required voltage via the respective output port. The control circuitry comprises a microcontroller. A respective DC-DC power converter of the plurality of DC-DC power converters comprises a step-down power converter. A respective DC-DC power converter of the plurality of DC-DC power converters is configured to provide both step-up and step-down power conversion.

A method of operating a power supply to supply power to a load device coupled to an output port of the power supply comprises receiving power at a first voltage level; converting the power at the first voltage level to a power at a second voltage level to provide the power at the second voltage level to the output port of the power supply; and selectively bypassing providing the power at the second voltage level to the output port and providing the power at the first voltage level to the output port of the power supply.

A method of operating a power supply comprising an AC input, an AC-DC power converter, and a DC-DC power converter comprises receiving AC power and determining that a required voltage of a first electrical device to be powered is within a first range of voltage levels provided by the AC-DC power converter. In response to the determination that the required voltage of the first electrical device is within the first range, the method further comprises programming the AC-DC power converter to convert the received AC power to DC power having a first voltage level corresponding to the required voltage of the first electrical device, and providing the DC power having the first voltage level to the first electrical device. The method includes determining that a required voltage and/or power of a second electrical device to be powered is within a second range of voltage and/or power levels available from the DC-DC power converter, and, in response to the determination that the required voltage and/or power of the second electrical device is within the second range of voltage and/or power levels, converting the received AC power to DC power using the AC-DC power converter. The method also includes programming the DC-DC power converter to convert the DC power from the AC-DC power converter to DC power having a second voltage level corresponding to the required voltage of the second device, and providing the DC power having the second voltage level to the second electrical device.

A converter circuit in a power supply to power a load device comprises a rectifier circuit configured to receive an input signal from a power source, the switch rectifier circuit being operable to convert the input signal to a DC output signal. The converter includes at least one switch coupled between the rectifier circuit and the power source, and a controller circuit configured to control the regulation of the DC output signal and the at least one switch, the controller circuit being operable to disconnect the rectifier circuit from the power source via the at least one switch and place the rectifier circuit in a power saving mode.

The converter circuit further comprises a switch control driver circuit configurable by the controller circuit to enable and disable the at least one switch. The converter circuit further comprises a feedback circuit configured to provide feedback to the controller circuit and regulate the DC output signal based on load device parameters. The feedback circuit may comprise a power factor correction circuit. The controller circuit may include a local controller.

The converter circuit further comprises a reserve power component configured to provide reserve power when the rectifier circuit is placed in a power saving mode. The reserve power component may be a capacitor.

The rectifier circuit and the at least one switch comprises a plurality of switches in place of diodes. The the plurality of switches may comprise at least one MOSFET. The controller circuit may be operable to disconnect the rectifier circuit by disabling the plurality of switches.

A rectifier bridge of a converter circuit comprises an AC input configured to receive an AC input signal. The rectifier bridge includes a first plurality of switches configured in series with each other and in series with a plurality of diodes, wherein at least one of the first plurality of switches is enabled responsive to the waveform of the AC input signal approaching a zero crossing and commutating at least one of the plurality of diodes. The rectifier bridge also includes a second plurality of switches configured in series with each other and in parallel with the first plurality of switches and the plurality of diodes, wherein at least one of the second plurality of switches is enabled responsive to the waveform of the AC input signal approaching a high level state and conducting power at the high level state, and wherein the second plurality of switches is disabled to provide an open circuit on the AC input and place the converter circuit in a zero power state or a power saving mode.

A method of placing a converter circuit in a power in a power saving mode comprises receiving an input signal from a power source at a rectifier circuit, converting the input signal to a DC output signal, and disabling at least one switch of the rectifier circuit. In response to disabling at least one switch of the rectifier circuit, the rectifier circuit is disabled from the power source and placed in a power saving mode.

A method of operating a rectifier bridge of a converter circuit comprises receiving an AC input signal. The method also comprises enabling at least one of a first plurality of switches responsive to the waveform of the AC input signal approaching a zero crossing, wherein the first plurality of switches is configured in series with each other and in series with a plurality of diodes. In response to enabling at least one of the first plurality of switches, the method includes commutating at least one of the plurality of diodes. The method also comprises enabling at least one of a second plurality of switches responsive to the waveform of the AC input signal approaching a high level state, to conduct power at the high level state, wherein the second plurality of switches are configured in series with each other and in parallel with the first plurality of switches and the plurality of diodes. The method further comprises disabling the second plurality of switches to provide an open circuit on the AC input and place the converter circuit in a zero power state or a power saving mode.

A power converter comprises an input port for receiving an input signal and an output port for providing an output signal. The power converter includes a first power stage configured to provide an intermediate signal at a first power state and a second power stage configured to provide an output signal at a second power state at the output port. The power converter further includes a switch control unit on a by-pass path coupled between the first power stage and second power stage, and operable to selectively bypass the second power stage to provide the intermediate signal at the first power state as the output signal.

The input signal of the power converter is an AC signal and the first power stage comprises an AC/DC converter configured to convert the AC signal to a DC signal. The first power stage is further configured to provide the intermediate signal at the first power state from a range of power levels. The second power stage may be a DC/DC converter. The output signal at the second power state may be a low power level relative to the intermediate signal at the first power state. The power converter further comprising a controller configured to receive power information from a load device, and operable to control the switch control unit responsive to the received power information. The first power stage of the power converter further comprises at least one switch controlled by the controller and enabled to place the first power stage in a power saving mode responsive to the controller receiving the power information. The first power stage may include a diode bridge comprising a plurality of switches controlled by the controller and enabled to place the first power stage in a power saving mode responsive to the controller receiving the power information.

A method for converting power comprises receiving an input signal at an input port, and providing an output signal at an output port. The method includes providing an intermediate signal at a first power state and providing an output signal at a second power state at the output port. The method further includes selectively bypassing the output signal at the second power state to provide the intermediate signal at the first power state at the output port.

The foregoing description, for purpose of explanation, has been described with reference to specific embodiments. However, the illustrative discussions above are not intended to be exhaustive or to limit the invention(s) to the precise forms disclosed. Many modifications and variations are possible in view of the above teachings. The embodiments were chosen and described in order to best explain the principles of the invention(s) and its practical applications, to thereby enable others skilled in the art to best utilize the invention(s) and various embodiments with various modifications as are suited to the particular use contemplated.

What is claimed is:

1. A power supply to provide power for an electrical device, comprising:
   an input port to receive an input signal;
   an output port coupled to the electrical device to provide an output signal;
   a first power converter to convert the received input signal to a first electrical signal having a first voltage level;
   a second power converter to convert the first electrical signal from the first power converter to a second electrical signal having a second voltage level, and provide the second electrical signal to the output port as the output signal;
   a circuit to selectively bypass the second power converter and provide the first electrical signal from the first power converter to the output port as the output signal;
   control circuitry, coupled to the circuit to selectively bypass the second power converter, to provide a control signal to selectively bypass the second power converter,
   the first power converter is programmable to vary the first voltage level within a first range of voltages;
   the second power converter is programmable to vary the second voltage level within a second range of voltages;
   wherein the control circuitry comprises:
      comparison circuitry to determine whether a desired voltage of an electrical device coupled to the output port is within the first range of voltages or the second range of voltages; and
      programming circuitry to provide a first programming signal to the first power converter to program the first voltage level to the desired voltage in response to a determination that the desired voltage is within the first range of voltages and to provide a second programming signal to the second power converter to program the second voltage level to the desired voltage in response to a determination that the desired voltage is within the second range of voltages.

2. The power supply of claim 1, wherein the circuit to selectively bypass the second power converter comprises a switch.

3. The power supply of claim 2, wherein the switch comprises a metal-oxide-semiconductor field-effect transistor (MOSFET).

4. The power supply of claim 1, wherein:
   the control circuitry is coupled to the second power converter to provide a disable signal to the second power converter when the second power converter is bypassed.

5. The power supply of claim 1, wherein:
   the control circuitry is coupled to the second power converter to provide an enable signal to the second power converter when the second power converter is not bypassed.

6. The power supply of claim 1, wherein the second range of voltages is lower than a minimum voltage level of the first range of voltages.

7. The power supply of claim 1, wherein the control circuitry comprises programming circuitry to provide a first programming signal specifying the first voltage level to the first power converter and a second programming signal specifying the second voltage level to the second power converter.

8. The power supply of claim 1, wherein the control circuitry further comprises:
   a communication interface to receive a signal specifying the desired voltage of the electrical device coupled to the output port.

9. The power supply of claim 8, wherein the communication interface is configured to receive the signal specifying the desired voltage via the output port.

10. The power supply of claim 1, wherein the control circuitry comprises a microcontroller.

11. The power supply of claim 1, wherein the second power converter comprises a step-down power converter.

12. The power supply of claim 1, wherein the second power converter is configured to provide both step-down and step-up power conversion.

13. The power supply of claim 1, wherein the first power converter is an AC-DC power converter, the second power converter is a DC-DC power converter, and the output signal is DC power.

14. The power supply of claim 13, further comprising:
   at least a second output port to provide DC power;
   at least a second DC-DC power converter to convert the DC power having the first voltage level to DC power having a third voltage level and to provide the DC power having the third voltage level to the additional output port; and at least a second circuit to selectively bypass the second DC-DC power converter and provide the DC power having the first voltage level to the second output port.

15. A method of operating a power supply comprising an AC input, an AC-DC power converter, and a DC-DC power converter, the method comprising:

receiving AC power;

determining that a desired voltage of a first electrical device to be powered is within a first range of voltage levels provided by the AC-DC power converter;

in response to the determination that the desired voltage of the first electrical device is within the first range:

programming the AC-DC, power converter to convert the received AC power to DC power having a first voltage level corresponding to the desired voltage of the first electrical device; and providing the DC power having the first voltage level to the first electrical device;

determining that a desired voltage of a second electrical device to be powered is within a second range of voltage levels available from the DC-DC power converter; and in response to the determination that the desired voltage of the second electrical device is within the second range of voltage levels:

converting the received AC power to DC power using the AC-DC power converter;

programming the DC-DC power converter to convert the DC power from the AC-DC power converter to DC power having a second voltage level corresponding to the desired voltage of the second device; and providing the DC power having the second voltage level to the second electrical device.

* * * * *